(12) United States Patent
Cox

(10) Patent No.: US 10,524,427 B2
(45) Date of Patent: Jan. 7, 2020

(54) AGRICULTURAL SYSTEMS AND METHODS

(71) Applicant: Klondike Agricultural Products, LLC, Tampa, FL (US)

(72) Inventor: Daniel S. Cox, Elon, NC (US)

(73) Assignee: Klondike Agricultural Products, LLC, Tampa, FL (US)

(*) Notice: Subject to any disclaimer, the term of this patent is extended or adjusted under 35 U.S.C. 154(b) by 1070 days.

(21) Appl. No.: 14/229,615

(22) Filed: Mar. 28, 2014

(65) Prior Publication Data

US 2014/0208648 A1    Jul. 31, 2014

Related U.S. Application Data

(63) Continuation-in-part of application No. 10/779,303, filed on Feb. 13, 2004, now Pat. No. 8,683,742.

(51) Int. Cl.
| | | |
|---|---|---|
| A01C 1/06 | (2006.01) | |
| A01G 9/02 | (2018.01) | |
| A01C 1/04 | (2006.01) | |
| A01G 22/00 | (2018.01) | |

(52) U.S. Cl.
CPC ............ *A01G 9/02* (2013.01); *A01C 1/04* (2013.01); *A01C 1/06* (2013.01); *A01G 22/00* (2018.02)

(58) Field of Classification Search
CPC ............ A01C 1/00; A01C 1/06; A01G 7/00
USPC ........................................................... 47/57.6
See application file for complete search history.

(56) References Cited

U.S. PATENT DOCUMENTS

| | | | |
|---|---|---|---|
| 755,865 A | | 3/1904 | Fraser et al. |
| 3,187,463 A | | 6/1965 | McCollough |
| 3,331,155 A | | 7/1967 | Chancellor |
| 3,844,987 A | | 10/1974 | Clendinning et al. |
| 3,847,641 A | * | 11/1974 | Cushman ............... A01N 61/02 106/271 |
| 3,973,355 A | * | 8/1976 | McKenzie ........... A01G 9/1086 47/57.6 |
| 4,008,544 A | | 2/1977 | Rupprecht et al. |
| 4,016,678 A | | 4/1977 | Larsen et al. |
| 4,145,206 A | * | 3/1979 | Ford ........................ A01C 1/06 47/57.6 |
| 4,186,670 A | | 2/1980 | Hagner |
| 4,192,096 A | | 3/1980 | Platt et al. |
| 4,628,633 A | * | 12/1986 | Nilsson ..................... A01C 1/06 249/122 |
| 4,706,411 A | | 11/1987 | Lovqvist |

(Continued)

FOREIGN PATENT DOCUMENTS

| | | |
|---|---|---|
| EP | 0607140 | 7/1994 |
| FR | 2690307 | 5/1992 |

(Continued)

OTHER PUBLICATIONS

Heo, Joo Hyung, "PCT Search Report", PCT/US2015/022709; Filed Mar. 26, 2015; PCT; dated Jun. 30, 2015.

*Primary Examiner* — David J Parsley

(57) ABSTRACT

An agricultural system includes a container containing a medium and a plant source. The medium may be a binder, and the container may further contain an additive bound to the binder. The medium may be pollen. The container may be any of closed, at least partially water permeable, at least partly biodegradable, or combinations thereof. The container can include an indicium that is perceptible from an exterior of the container.

62 Claims, 12 Drawing Sheets

(56) References Cited

U.S. PATENT DOCUMENTS

| | | | |
|---|---|---|---|
| 4,769,945 A * | 9/1988 | Motoyama | A01H 4/001 47/57.6 |
| 4,777,762 A | 10/1988 | Redenbaugh et al. | |
| 4,779,376 A * | 10/1988 | Redenbaugh | A01C 1/06 47/57.6 |
| 4,808,430 A * | 2/1989 | Kouno | A01C 1/06 427/350 |
| 5,010,685 A | 4/1991 | Sakamoto et al. | |
| 5,106,648 A | 4/1992 | Williams | |
| 5,129,180 A | 7/1992 | Stewart | |
| 5,236,439 A | 8/1993 | Carlson et al. | |
| 5,250,082 A * | 10/1993 | Teng | A01H 4/006 47/57.6 |
| 5,300,127 A | 4/1994 | Williams | |
| 5,334,229 A | 8/1994 | Sakamoto | |
| 5,347,753 A | 9/1994 | Dall | |
| 5,427,593 A | 6/1995 | Carlson et al. | |
| 5,429,654 A | 7/1995 | Swarup | |
| 5,451,241 A | 9/1995 | Carlson et al. | |
| 5,486,218 A | 1/1996 | Carlson et al. | |
| 5,564,224 A | 10/1996 | Carlson et al. | |
| 5,572,827 A | 11/1996 | Conrad | |
| 5,595,748 A | 1/1997 | Hewlett et al. | |
| 5,666,762 A | 9/1997 | Carlson et al. | |
| 5,687,504 A | 11/1997 | Carlson et al. | |
| 5,701,699 A | 12/1997 | Carlson et al. | |
| 5,732,505 A * | 3/1998 | Carlson | A01H 4/006 47/57.6 |
| 5,787,640 A | 8/1998 | Duke | |
| 5,794,550 A | 8/1998 | Chadwick | |
| 5,930,949 A | 8/1999 | Tsujimoto et al. | |
| 6,112,457 A * | 9/2000 | Kohno | A01C 1/06 47/57.6 |
| 6,119,395 A * | 9/2000 | Hartle | A01H 4/006 47/57.6 |
| 6,164,012 A | 12/2000 | Lechelt-Kunze et al. | |
| 6,311,426 B1 | 11/2001 | Mehta et al. | |
| 6,557,298 B2 | 5/2003 | Obert et al. | |
| 6,572,809 B1 | 6/2003 | Nishiyama et al. | |
| 7,131,234 B2 | 11/2006 | Carlson et al. | |
| 7,168,205 B2 | 1/2007 | Hartle et al. | |
| 7,228,658 B2 | 6/2007 | Hirahara et al. | |
| 7,356,965 B2 | 4/2008 | Carlson et al. | |
| 7,490,436 B2 | 2/2009 | Kohno et al. | |
| 7,547,488 B2 | 6/2009 | Dimakis et al. | |
| 7,568,309 B2 | 8/2009 | Hirahara | |
| 7,591,297 B2 | 9/2009 | Hirahara | |
| 7,603,807 B2 | 10/2009 | McKinnis et al. | |
| 7,654,037 B2 | 2/2010 | Hartle | |
| 8,141,293 B2 | 3/2012 | Ronneke | |
| 8,683,742 B1 * | 4/2014 | Cox | A01C 1/04 47/57.6 |
| 2003/0101643 A1 * | 6/2003 | Hartle | A01H 4/005 47/57.6 |
| 2003/0187181 A1 | 10/2003 | Sakane et al. | |
| 2005/0102895 A1 * | 5/2005 | Bissonnette | A01H 4/001 47/57.6 |
| 2008/0202026 A1 | 8/2008 | Bong Kyun | |
| 2010/0263274 A1 * | 10/2010 | Corak | A01C 1/06 47/57.6 |
| 2011/0083363 A1 | 4/2011 | Trias Vila et al. | |
| 2013/0174483 A1 | 7/2013 | Caspar et al. | |
| 2013/0252316 A1 | 9/2013 | Tyler | |
| 2014/0087942 A1 | 3/2014 | Trias | |
| 2014/0208648 A1 | 7/2014 | Cox | |

FOREIGN PATENT DOCUMENTS

| | | |
|---|---|---|
| JP | 2001340005 | 12/2001 |
| JP | 2008253184 | 10/2008 |
| WO | 97/36471 | 10/1997 |
| WO | 98/33375 | 8/1998 |
| WO | 02/21914 | 3/2002 |
| WO | 03/045139 | 6/2003 |
| WO | 2006/134623 | 12/2006 |

* cited by examiner

AGRICULTURAL SYSTEMS AND METHODS

CROSS-REFERENCE TO RELATED APPLICATIONS

This application is a continuation-in-part of application Ser. No. 10/779,303, entitled "Agricultural System," filed on Feb. 13, 2004, and incorporated herein by reference.

TECHNICAL FIELD OF THE DISCLOSURE

The present invention relates generally to agricultural systems and methods and, more particularly, to agricultural systems and methods including a container containing a medium and a plant source.

BACKGROUND

Agricultural growers such as commercial suppliers and home gardeners produce a wide variety of cultivated crops and plants. Often these suppliers or gardeners raise plants from seeds. Soil or another growing medium may be supplemented with additional water, fertilizers, pesticides, agents for controlling pH, and the like, to promote seed germination. This process is labor-intensive and time-consuming, which adds costs to commercial operations and detracts from the enjoyment of gardening for recreational gardeners, especially those advanced in age or physically limited.

Some growers raise cultivated plants from seeds in pots or other small containers, in some cases in greenhouses. Such a grower often transplants the seedling plant to the ground after an initial period in the container. This process is also labor-intensive and time-consuming.

In recent years, roll-out flower gardens have been developed that reduce part of the painstaking work required to grow a home garden. The roll-out gardens may consist of seeds within a nutrient rich substrate. These roll out gardens reduce part of the labor associated with growing flower gardens, but they are bulky and awkward to use, store, and transport.

In addition, many areas in which plants are grown lack optimal growing conditions. Lack of moisture, sunlight, nutrients, etc. may hinder seed germination and plant growth. Diseases, weeds, insects, animals (e.g., that scavenge seeds shortly after planting), etc. may cause similar effects. Further, many farmers in suboptimal growing areas lack general planting, cultivation, and harvesting knowledge needed to successfully grow food crops. The inability to grow and cultivate plants, especially staple crops (for example, corn, rice, sorghum, soybeans, wheat, etc.), can have a devastating effect on the health and well-being of people living in these areas. Furthermore, the high cost and time-consuming procedures associated with seed production, handling, and distribution may limit the availability of seeds in these areas. In addition, the cultivation of plants by conventional methods often has adverse environmental effects (e.g., pollution from fertilizer, pesticide, etc.; use of excessive resources).

Accordingly, there is a need for agricultural systems and methods that facilitate successful handling, distribution, and planting of seeds, and that promote and improve cultivation and yield of plants that grow from the seeds. In this regard, it would be useful to provide simplified solutions to issues of moisture, nutrients, pests, weeds, disease, etc. It would also be useful to provide methods and systems of cultivating plants that conserve resources and limit adverse environmental effects. It would also be useful to increase the shelf life of seeds, that is, the length of time seeds can remain healthy prior to planting. In this regard, it will be noted that prior art methods of coating or pelletizing seeds (e.g., to provide seed pellets or coated seeds of uniform size to facilitate mechanized planting) impose stresses on the seeds that hinder germination. Specifically, in such methods, the medium, additives, etc. that are contained with the seed in the coating or pellet are adhered to the seed. As a result of this adhesion, first, the seed may not be able to receive sufficient moisture and oxygen from the environment, and, second, the seed may be harmed by being in such close proximity to strong additives (e.g., fertilizers, pesticides).

SUMMARY

Embodiments of the present invention provide agricultural systems and methods for promoting seed germination and/or plant growth. These systems and methods may resolve or mitigate at least some of the limiting factors described above. These systems and methods may be easy to use, compact, adaptable for different kinds of plants and growing environments, and environmentally friendly.

According to a first aspect, there is provided an agricultural system including at least one seed, a growing medium in communication with the at least one seed, and a container containing the at least one seed and the growing medium. The at least one seed may include at least one primary seed of a first species and at least one secondary seed of a second species, wherein the second species differs from the first species. The growing medium may include moisture in the amount of between about 10 and 40 weight percent of the growing medium.

According to a second aspect, there is provided an agricultural system, including a container, defining a boundary between an interior region, interior to the container, and an exterior of the container; a binder contained in the interior region of the container; one or more additives bound to the binder; and a plant source contained in the interior region of the container.

According to a second aspect, there is provided an agricultural system, including a container, defining a boundary between an interior region, interior to the container, and an exterior of the container; pollen contained in the interior region of the container; and a plant source contained in the interior region of the container.

According to further aspects, agricultural methods and other agricultural systems are provided.

Other aspects and advantages of the embodiments described herein will become apparent from the following description and the accompanying drawings, illustrating the principles of the embodiments by way of example only.

BRIEF DESCRIPTION OF THE DRAWINGS

The following figures form part of the present specification and are included to further demonstrate certain aspects of the present claimed subject matter, and should not be used to limit or define the present claimed subject matter. The present claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which like reference numerals may identify like elements, wherein:

FIG. 5A shows a system including a container, a medium, an additive, and a plant source, in which system the container is closed; FIG. 5B shows a system including a container, a medium, an additive, and a plant source, in which system the container is open; and FIG. 5C shows a system including a container, pollen and a plant source;

NOTATION AND NOMENCLATURE

Certain terms are used throughout the following description and claims to refer to particular system components and configurations. As one skilled in the art will appreciate, the same component may be referred to by different names. This document does not intend to distinguish between components that differ in name but not function. In the following discussion and in the claims, the terms "including" and "comprising" are used in an open-ended fashion, and thus should be interpreted to mean "including, but not limited to . . . ." The word "or" is used in the inclusive sense (i.e., "and/or") unless a specific use to the contrary is explicitly stated. Also, it is to be understood that such terms as "forward," "rearward," "left," "right," "upwardly," "downwardly," and the like are words of convenience and are not to be construed as limiting terms.

DETAILED DESCRIPTION

The foregoing description of the figures is provided for the convenience of the reader. It should be understood, however, that the embodiments are not limited to the precise arrangements and configurations shown in the figures. Also, the figures are not necessarily drawn to scale, and certain features may be shown exaggerated in scale or in generalized or schematic form, in the interest of clarity and conciseness. Relatedly, certain features may be omitted in certain figures, and this may not be explicitly noted in all cases.

While various embodiments are described herein, it should be appreciated that the present invention encompasses many inventive concepts that may be embodied in a wide variety of contexts. The following detailed description of exemplary embodiments, read in conjunction with the accompanying drawings, is merely illustrative and is not to be taken as limiting the scope of the invention, as it would be impossible or impractical to include all of the possible embodiments and contexts of the invention in this disclosure. Upon reading this disclosure, many alternative embodiments of the present invention will be apparent to persons of ordinary skill in the art. The scope of invention is defined by the appended claims and equivalents thereof.

Illustrative embodiments of the invention are described below. In the interest of clarity, not all features of an actual implementation are described or illustrated in this specification. In the development of any such actual embodiment, numerous implementation-specific decisions may need to be made to achieve the design-specific goals, which may vary from one implementation to another. It will be appreciated that such a development effort, while possibly complex and time-consuming, would nevertheless be a routine undertaking for persons of ordinary skill in the art having the benefit of this disclosure.

Figure 1:
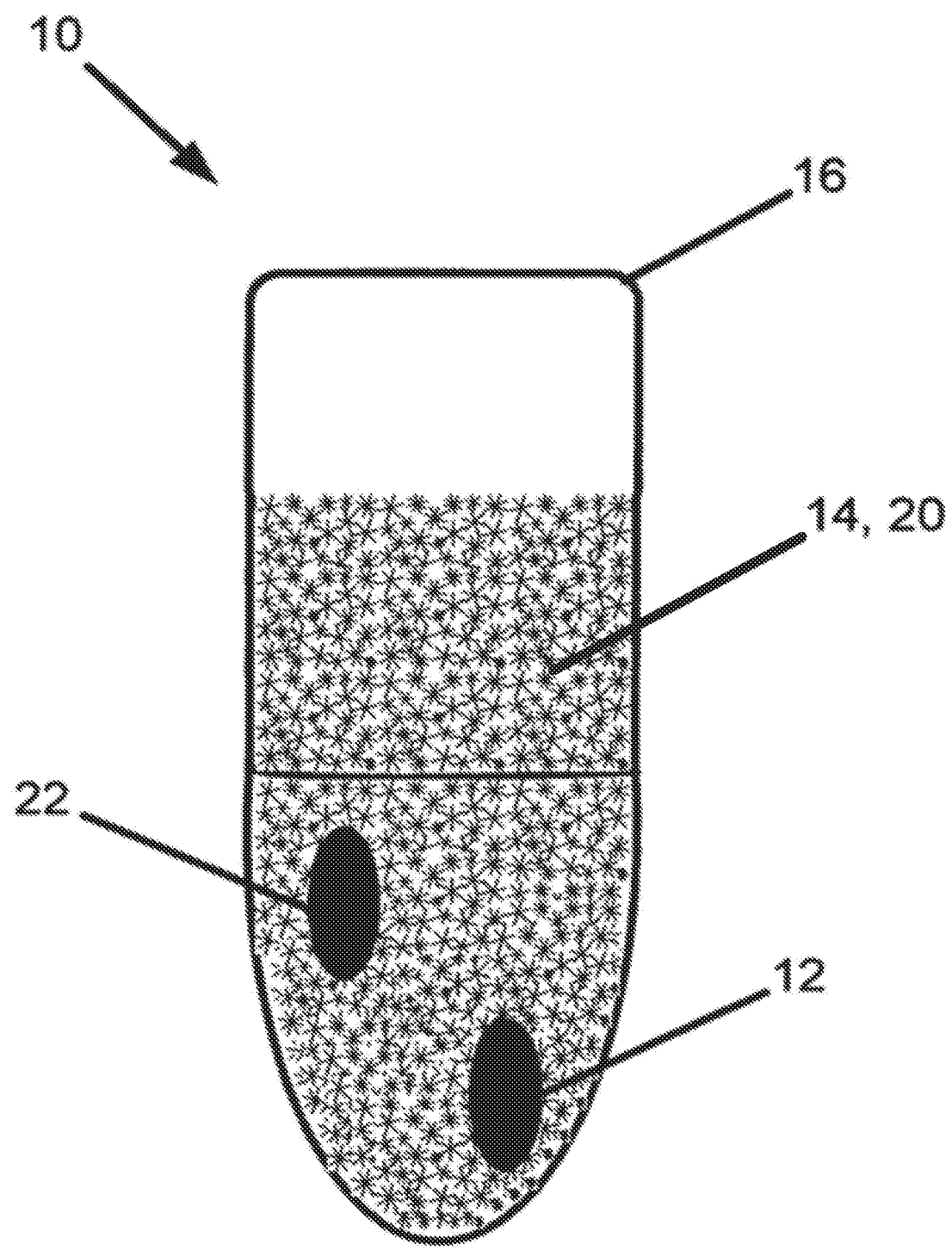
FIG. 1 is a schematic cross-sectional view of an agricultural system, in accordance with at least some embodiments.

The initial portion of the "Detailed Description" section of the instant disclosure provides description with reference to FIGS. 1-4. As best seen in FIG. 1, according to an embodiment, at least one seed capable of germination is disposed in a growing medium 14, and both the at least one seed and the growing medium 14 are retained in an outer retainer 16. The growing medium 14 may include one or more additives 20. In addition, at least one secondary seed 22 may also be used to compliment the 15 primary seed 12.

Figure 2:
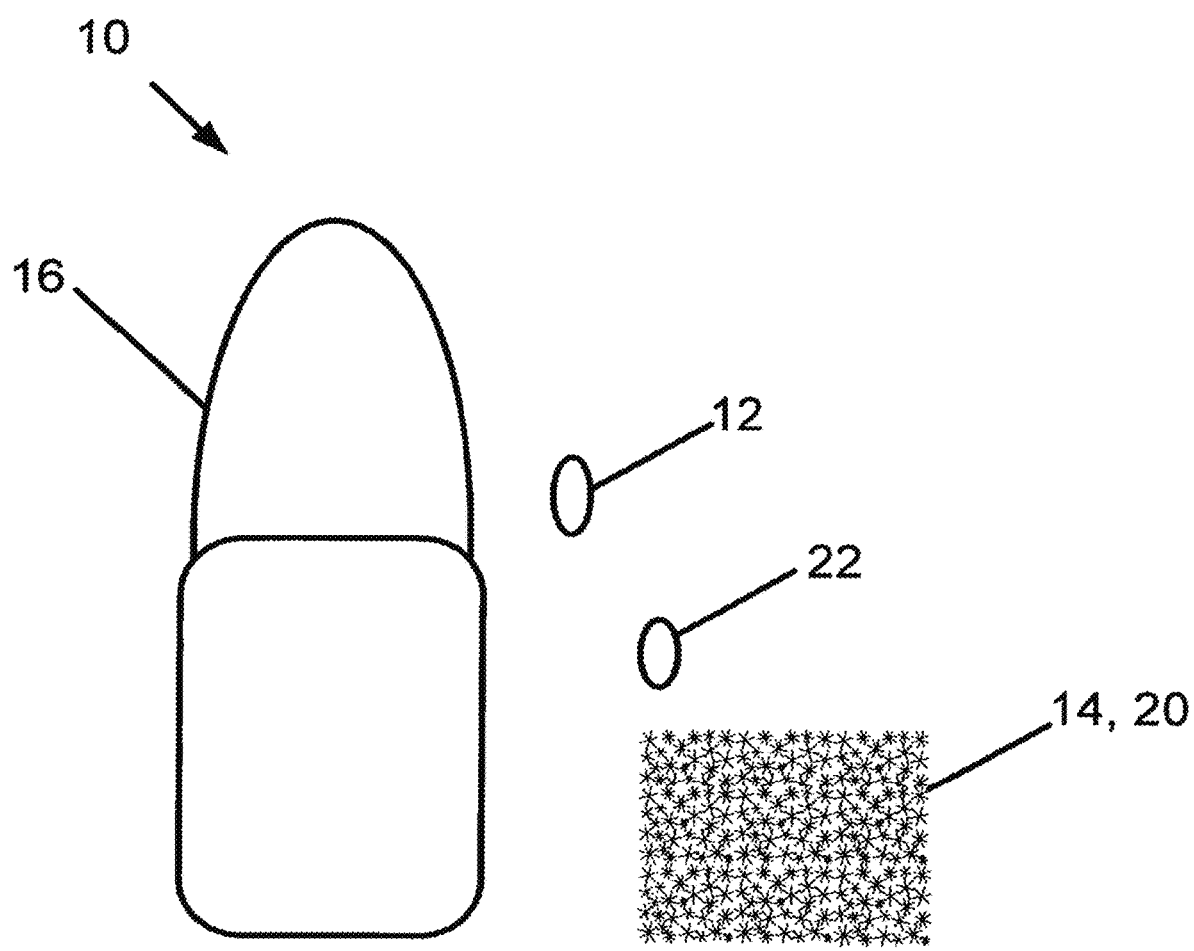
FIG. 2 is a schematic view of the components of the agricultural system shown in FIG. 1, prior to assembly, in accordance with at least some embodiments.

As best seen in FIG. 2, the agricultural system 10 components may be divided into three groups, namely, seed(s), other contents of the retainer 16 (e.g., growing medium 14, additives 20, etc.), and the retainer 16. The first group is the plant or flower seed 12 with or without the secondary seed 22. In an embodiment, the plant or flower seed is a non-dormant seed. These types of seeds are the most common agricultural and garden type seeds which, unlike gumballs, pinecones and peanuts, do not normally have a natural outer protective shell. Either of primary seed 12 and secondary seed 22 may be either dormant or non-dormant.

Secondary seed 22 may actually include one or more seeds. Secondary seed(s) 22 may have a longer germination period and therefore begin to grow after the primary seed 12, or may have a slower growth period and overtake the primary seed 12 plant, or may have a longer life and remain after the primary seed 12 plant has died. The following table (Table 1) shows examples of primary seed 12 and secondary seed 22 having these combinations.

TABLE 1

| | Primary Seed | Secondary Seed |
| --- | --- | --- |
| Secondary Seed has a Greater Growth and Germination Period than Primary Seed | onions | peppers |
| Secondary Seed has a Shorter Growth Period than Primary Seed | corn | potatoes |
| Secondary Seed has a Longer Life than Primary Seed | beets | beans |

Growing medium 14 may be an organic material and in particular a natural soil such as peat. However, it will be appreciated that the growing medium may also include inorganic or organic fillers such as conventionally used and seed starting pots.

Figure 3:
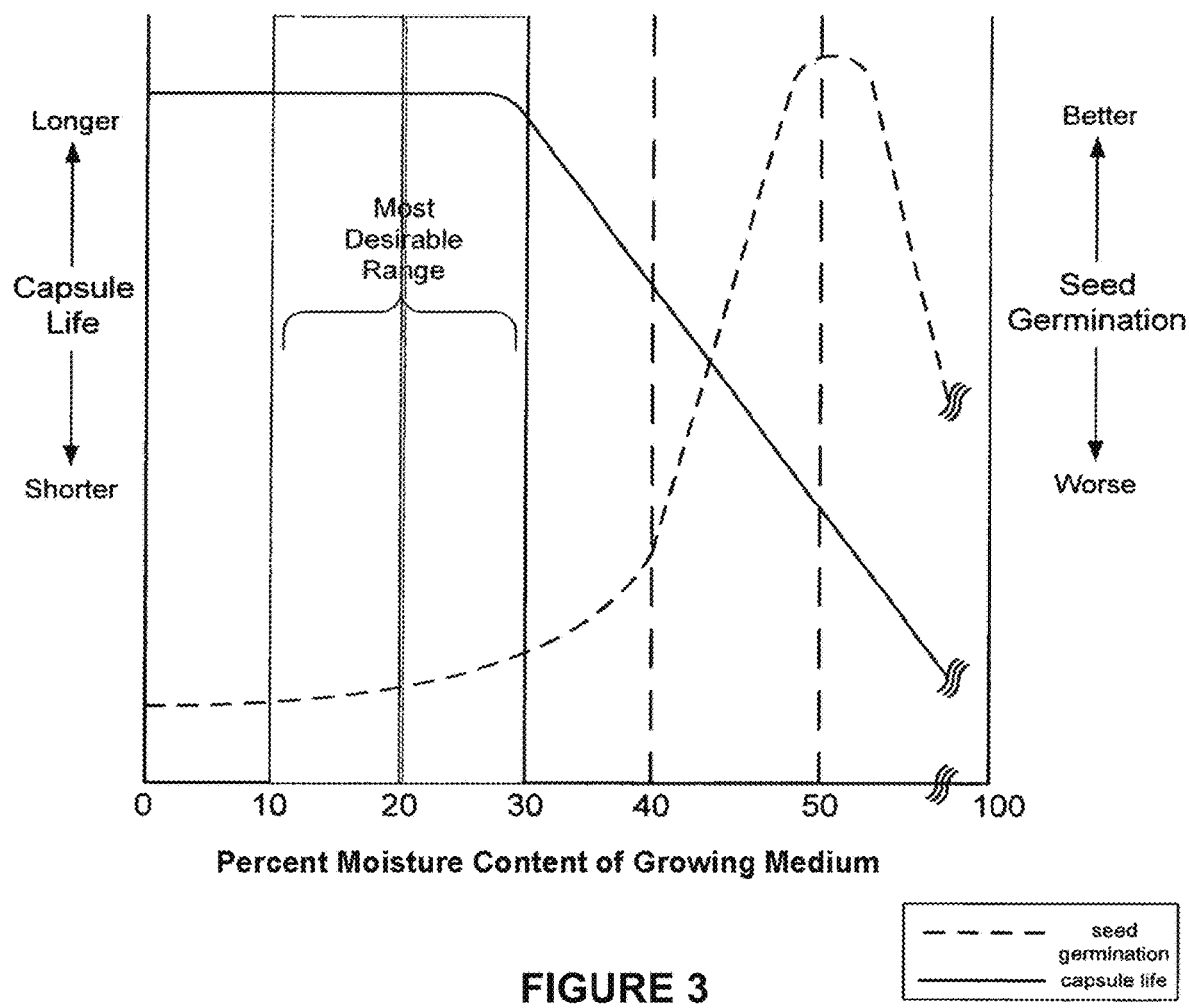
FIG. 3 is a graphical representation of (a) the relationship between capsule life and moisture content of the growing medium, and (b) the relationship between seed germination and moisture content of the growing medium, in accordance with at least some embodiments.

One function that may be served by the growing medium 14 is controlling the moisture content within the outer retainer 16. As can be seen in FIG. 3, the capsule life for most suitable materials drops off quickly as percent moisture content of the growing medium 14 increases above about 40 percent. At the same time the germination of the seed 12 increases sharply when the percent moisture content of the growing medium 14 increases above 40 percent. In some embodiments the percent moisture' content of the growing medium 14 is less than about 50 percent, in order to promote capsule life and reduce germination. In some embodiments the percent moisture content of the growing medium 14 is between about 10-30 percent. In some embodiments the percent moisture content of the growing medium 14 is about 20 percent.

Figure 4:
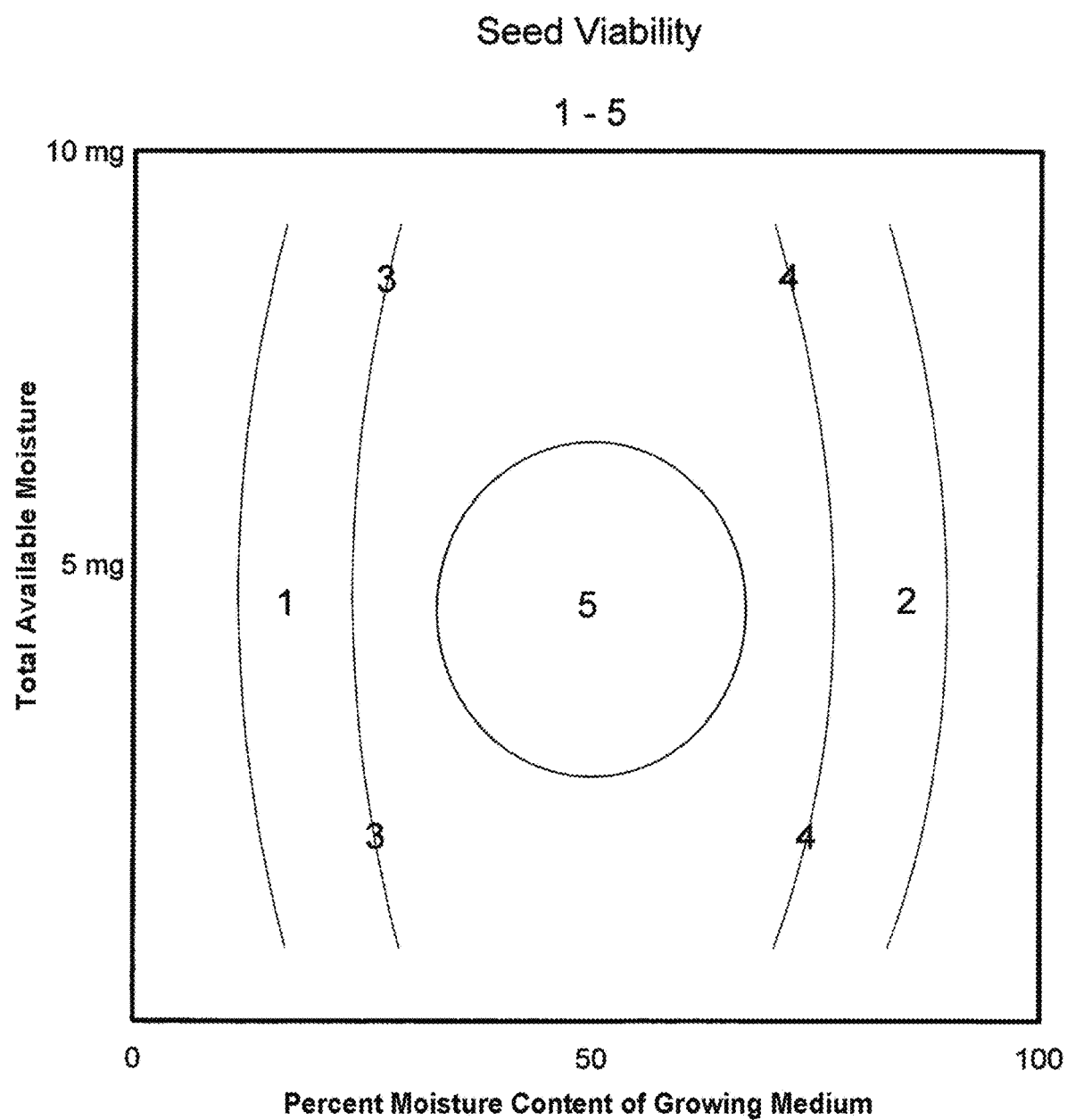
FIG. 4 is a graphical representation of the seed viability, indicated on a dimensionless scale of 1-5, as a function of the moisture content of the growing medium and as a function of the total available moisture, in accordance with at least some embodiments.

Turning to FIG. 4, there is shown a graphical representation of seed viability as a function of the percent moisture content in the growing medium 14 and as a function of the total available moisture (measured in milligrams). Seed viability is measured on a dimensionless scale of 1 to 5. As can be seen in the figure, seed viability increases rapidly with the increase in percent moisture content of the growing medium 14, reaching a maximum but then dropping off as the moisture content of the growing medium 14 becomes so high as to 'drown' the seed. The total available moisture is not as critical a variable. As seen in the figure, seed viability increases as the total available moisture reaches about five milligrams but then begins to drop off as the total available moisture is increased past about ten milligrams.

In a preferred embodiment outer retainer 16 is a biodegradable material. In some embodiments outer retainer 16 is a capsule such as a two-piece capsule, which can be produced on a model CS-M2 capsule machine available from Maneklal Global Exports of 237/239 Perin Nariman Street Fort, Mumbai—400 001, India. Alternatively, the two-piece capsule may be assembled using the Profill100 or Profiller1100, available from Torpac, Inc., 333 Route 46, Fairfield, N.J., USA. These types of capsules may be gelatin based or cellulose-based, for example. These types of capsules may be water-soluble.

In some embodiments the material of outer retainer 16 may also include at least one capsule additive, such as a pigment or a solid preservative such as propanate or titanium dioxide, to provide additional functions such as improved ease of identification of the seed 12 within the outer retainer 16 or to extend the shelf life of the outer retainer 16.

In some embodiments the growing medium 14 may further include growing medium additives 20. For example, the growing medium 14 may include a protein to facilitate plant germination. Organic protein enzymes such as those in fish oils, peanut oils, and bark composts have been found to be specifically suitable for this purpose. In addition the additive 20 may include conventional fertilizers such as to provide additional phosphate, nitrogen or other mineral(s) suited to the specific type of seed or soil condition. In addition the additive 20 may also include conventional pesticides (which term is intended to include fungicides) depending on the needs of the particular growing conditions. Finally, the additive 20 may also be microencapsulated or otherwise treated to provide a time release of the additive 20 over a predetermined period of the early germination of the seed 12.

Variations of the above embodiments include, but are not limited to, the following. Other combinations and medium formulas may be used as desired for the particular seed of the agricultural system. Also, if desired, the outer retainer of the agricultural system may include a fertilizer for promoting the growth of the particular seed into maturity.

The following portion of the instant disclosure describes various further embodiments, with reference to FIGS. 5A, 5B, 5C, 6A, 6B, 6C, 6D and 7. While these further embodiments may share certain features or aspects with the embodiments described heretofore in this "Detailed Description" section of the instant disclosure (with reference to FIGS. 1-4), these further embodiments are not to be construed as being limited by the description presented heretofore in this "Detailed Description" section of the instant disclosure. Rather, the following portion of the "Detailed Description" section of the instant disclosure should be understood as a self-contained portion of the "Detailed Description" section of the instant disclosure.

Initially, a simplified overview of these further embodiments is provided, without direct reference to the figures, with the understanding that details and clarifications will be provided in the subsequent, more detailed description of these embodiments.

For convenience, in this simplified overview, reference is made to a seed; as will be explained in the more detailed description below, these further embodiments are also applicable to other plant sources. The term "plant source" is understand to encompass any entity capable of growing into a plant or into a portion of a plant, or a part of such entity; further description of plant sources is provided in the more detailed description below. In addition, it is noted that the element "additive" discussed herein may also be referred to as adjuvant.

According to a first set of these further embodiments, an agricultural system comprises a container containing a seed or the like, a binder, and one or more additives. The container containing the seed, binder, and additive(s) is planted. The additive(s) may be, e.g., fertilizer, pesticide, etc. The binder anchors or holds the one or more additives and water in the vicinity of the seed (and, subsequently, of the plant that grows from the seed), but not in direct contact with the seed/plant. The one or more additives and water are released for uptake and use by the seed/plant in a controlled manner, so as to provide optimal amounts at optimal times and to prevent both deficiency and excess, it being understood that both deficiency and excess may harm or kill the seed/plant, or expose the seed/plant to harm or potential death. The container provides a protective environment, which may also shield the seed from harm and help ensure that nutrients and the like required by the seed/plant remain available to the seed/plant. The container may be designed in different ways to provide different levels of protection. For example, the container may provide a sterile, sealed environment that protects the seed/plant against pathogens and other harmful elements.

With regard to water, the binder provides for a water retention/reservoir system that provides water to the seed/plant as needed, thus avoiding deficiency, and also retains unneeded water, thus avoiding excess, i.e., preventing the plant from 'drowning'. The binder effectively provides both a supply of water available to the seed/plant and a barrier preventing excess water from reaching the seed/plant. Thus, the binder protects the seed/plant against both drought and flood.

The above-described agricultural system may also provide optimal growing conditions for the seed/plant. For example, the container may contain a growing medium suitable for the type of seed/plant and/or the type of growing environment, and the pH of the growing medium or of other contents of the container may be adjusted to a similarly suitable value.

As the contents of the container may be selected or modified so as to be optimal for the type of seed/plant and/or growing environment, the agricultural system may be said to provide for customized growing or customized agriculture. That is, all of the growing conditions and components may be customized and optimized for the particular type of seed/plant and/or the particular growing environment.

By virtue of the above-described aspects of the agricultural system, the agricultural system may greatly increase germination rates (percent of seeds germinating), growth (size of plant), yield (amount of harvestable crop), and growth rate (growth per unit time; hence, reducing cycle time), and may render the germination time (time required for germination to occur) and growth rate very uniform.

The agricultural system also permits of modification to take into account and exploit future developments in agricultural technology. That is, the container provides the capacity to add other ingredients to the vicinity of the seed/plant. These other ingredients may be retained for use of the seed/plant on a controlled basis, while being prevented from causing harm to the seed/plant.

The agricultural system may provide significant environmental benefits. The agricultural system may significantly conserve resources and reduce pollution. As for conservation, for example, the amount of additives required for growing plants may be greatly reduced. In addition, the additives do not need to be applied to entire growing areas (e.g., fields), but rather only disposed within the containers. These aspects may save a large amount of material resources, as well as a large amount of labor and its attendant environmental cost. Though not an environmental benefit, these aspects may thus also save a great deal of time and expense. As for the reduction of pollution, since the amount of additives (e.g., fertilizer, pesticide) used may be greatly reduced, and since the additives need not be added to the ground, but only to the containers containing the seeds/plants, runoff and leaching of additives may be reduced, and residual additives remaining in the ground may be reduced. As another example, the containers may be made of materials that biodegrade into elements useful for the seed/plant (e.g., fertilizer).

The agricultural system provides for flexibility as to use in different kinds of environments and with different agricultural practices. For example, it may be used in either natural growing environments or non-natural growing environments (e.g., greenhouses, environments without growing media). It may also be used for organic or conventional growing.

The agricultural system provides for flexibility as to the timing/coordination of manufacturing and preparing system components and planting. For example, the containers may have a multi-year shelf life. This permits flexibility in the timing of the manufacturing, preparation and planting processes. Coordination of these several processes is not tied to strict timing requirements.

The agricultural system does not require expansive outlay of capital or expensive investment in equipment. For example, the containers may be manufactured by relatively simple and inexpensive, existing technology for manufacturing pharmaceutical capsules or the like. As another example, by using containers of uniform size and shape, the respective processes of manufacturing, filling, and planting the containers may each be carried out by a single type of machine.

According to a second set of these further embodiments, an agricultural system comprises a container containing pollen and a seed or the like. The container containing the seed and pollen is planted. The pollen remains with the seed and with the plant that grows therefrom. At the applicable stage in the plant's life, the plant may be pollinated by the pollen. The plant may thus be self-pollinated, rather than having to rely on pollination by bees.

As will be understood from the above simplified overview, the first and second sets of further embodiments may share some aspects of so-called 'precision agriculture' (a term that has been variously defined) but should not be taken as being limited by that term.

Further to the above simplified overview, a more detailed description of these further embodiments is now provided. Initially, a more detailed description of agricultural systems according to the first set of further embodiments is provided, with reference to FIGS. 5A and 5B. Then, a more detailed description of agricultural systems according to the second set of further embodiments will be provided, with reference to FIG. 5C. Subsequently, a more detailed description of agricultural methods according to the first and second sets of further embodiments will be provided with reference to FIGS. 6A-6D. Finally, a description of certain data/experimental results pertaining to these further embodiments will be provided with reference to FIG. 7.

Figure 5A:
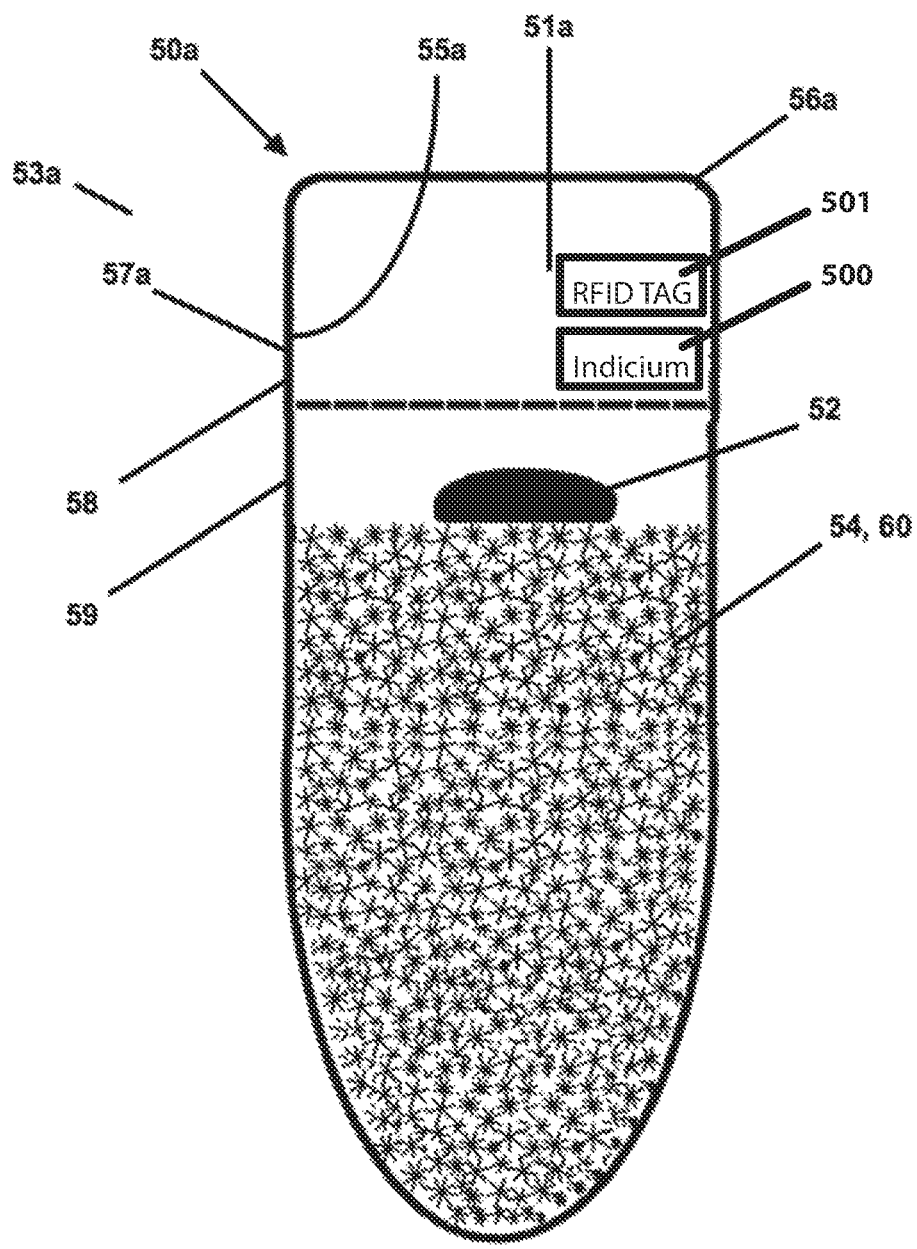
FIGS. 5A, 5B, and 5C are schematic illustrations of agricultural systems, according to embodiments of the present disclosure.

FIG. 5A shows an agricultural system 50a, which may include a container 56a, a medium 54, and a plant source 52. Agricultural system 50a may also include one or more additives 60. Container 56a defines a boundary between an interior region 51a, interior to container 56a, and the exterior 53a of container 56a. Interior region 56a may be said to have a volume or capacity. Medium 54, additive(s) 60 and plant source 52 (all described further below) may be contained in interior region 51a of container 56a. Container 56a may include an interior surface 55a, adjacent to interior region 51a, and an exterior surface 57a, adjacent to exterior 53a. Container 56a is closed, meaning that container 56a forms a closed shape, and the interior region 51a is separated/bounded from exterior 53a by a physical (at least partly solid) boundary that completely surrounds interior region 51a. Aside from the fact that container 56a is closed, the configuration (e.g., shape, size) of container 56a may vary from that illustrated. Container 56a may be a capsule such as a pharmaceutical capsule (either for human beings or for animals) or may be another kind of container. Container 56a may be another kind of container of a size and/or shape identical or similar to the size/shape of a pharmaceutical capsule. Container 56a may be of a size and/or shape differing from the size/shape of a pharmaceutical capsule. Container 56a may comprise two pieces 58 and 59 (as indicated by the dotted line), which pieces 58 and 59 may be joined together after filling of container 56a with its contents (described below). Container 56a may also comprise a single piece (not illustrated in FIG. 5A), in which case a portion of container 56a may be formed, container 56a may be filled, and then the remainder of container 56a may be formed. Container 56a may also comprise more than two pieces (not illustrated in FIG. 5A).

Figure 5B:
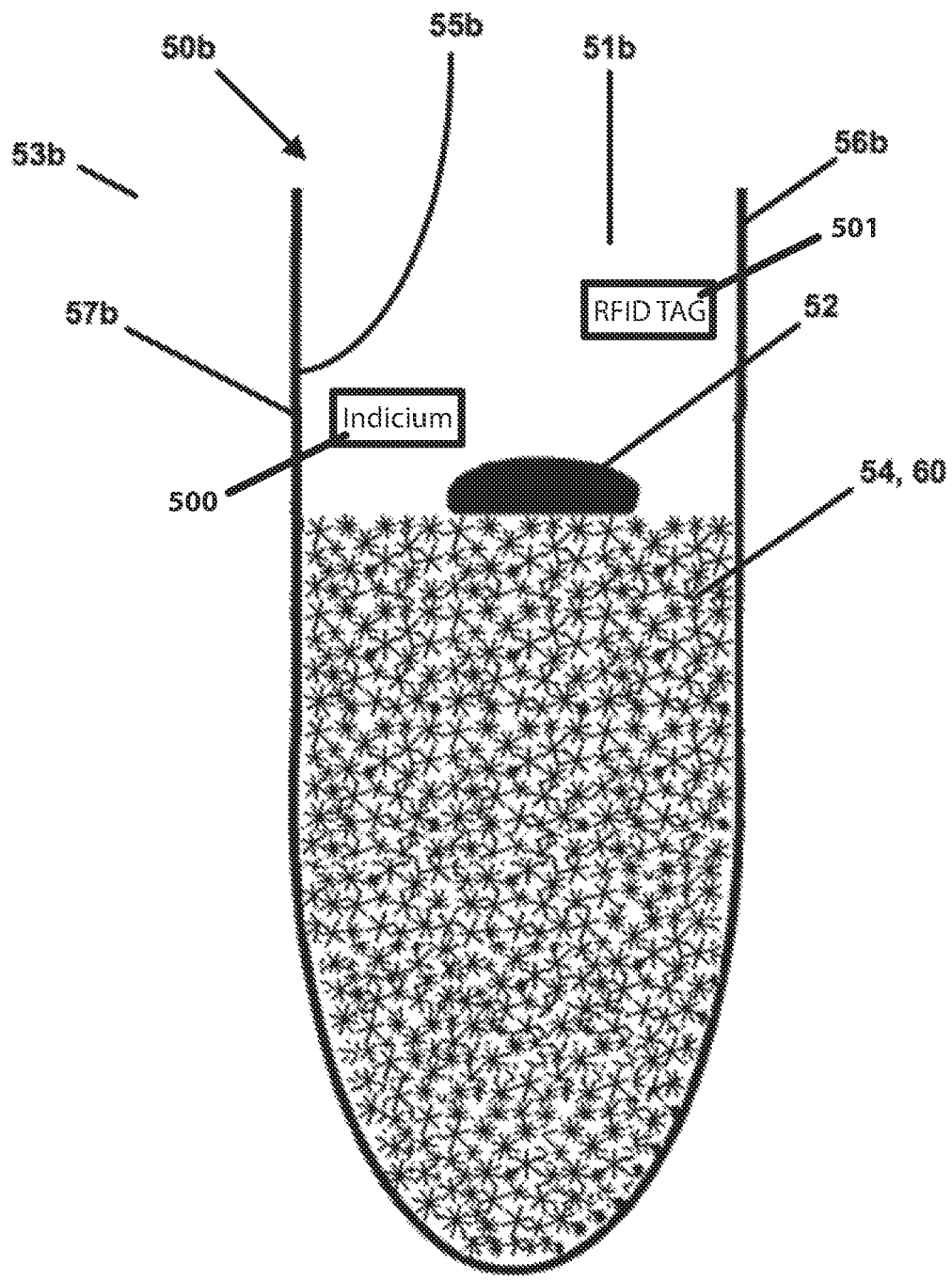

FIG. 5B shows an agricultural system 50b similar to agricultural system 50a, but with certain differences. Agricultural system 50b of FIG. 5B will generally be described only to the extent of explaining the differences between it and agricultural system 50a of FIG. 5A. Elements labeled with reference numbers ending in "a" in FIG. 5A correspond to elements labeled with the same reference numbers but ending in "b" in FIG. 5B. Identical reference numbers in FIGS. 5A and 5B refer to identical elements, although in respect of both figures such elements may admit of variation from what is illustrated, as described in the instant specification.

Agricultural system 50*b* differs from agricultural system 50*a* in that the former includes an open, or partly closed, container 56*b*, while the latter includes a closed container 56*a*. The term "open container" is used herein synonymously with the term "partly closed container." A closed container has been defined above in the description of container 56*a*. The difference between a closed container and an open container may be explained as follows. In contrast to closed container 56*a*, open container 56*b* does not form a closed shape, and the interior region 51*b* is separated/bounded from exterior 53*b* by a boundary that is partly a physical (at least partly solid) boundary and partly an imaginary (non-physical, non-solid) boundary; interior region 51*b* is not completely surrounded by a physical boundary. It is noted that, even though container 56*a* is closed, container 56*a* may be designed to be permeable to liquids (e.g., water) or gases, as discussed below.

Container 56*b* is open, and has no physical boundary, at its top (reference made herein to "top," "bottom", "side," other directional terms, and the like is to be understood as referring to the figures and is not to be taken as limiting). Nonetheless, interior region 51*b* extends all the way to the top of the sidewalls of container 56*b*. Accordingly, as schematically illustrated in FIGS. 5A and 5B, interior region 51*b* is of a size and shape that are identical or similar to those of interior region 51*a*.

Closed container 56*a* may be thought of as being closed in the sense that a closed box, jar, balloon, or pill capsule is closed, while open container 56*b* may be thought of as being open in the sense that an opened paper bag is open. To be sure, however, open container 56*b* may be less open (more closed) or more open (less closed) than is illustrated in FIG. 5B, which (like FIGS. 1, 2, 5A and 5C) is schematic and not necessarily drawn to scale. That is, the opening, or the extent of the above-noted imaginary boundary, may be smaller or larger than shown in FIG. 5B. Unlike an opened paper bag, open container 56*b* may be open to any extent.

Closed container 56*a* may be said to completely surround or enclose medium 54, additive(s) 60 and plant source 52. Open container 56*b* may be said to partly surround or enclose medium 54, additive(s) 60 and plant source 52.

Agricultural system 50*b* further differs from agricultural system 50*a* in that the former includes a container 56*b* formed of a single piece, while the latter includes a container 56*a* including two pieces. As with container 56*a*, container 56*b* is not limited to a given number of pieces, but rather may comprise two or more pieces (not illustrated in FIG. 5B).

According to some embodiments, closed container 56*a* may be made tamper-proof. This may serve applications where it must be known, verified, guaranteed, or the like that the contents of container 56*a* have not been changed after they have been placed in container 56*a* and container 56*a* has been closed/sealed.

Where the size of container 56*a*, 56*b* is identical or similar to that of a pharmaceutical capsule (for human ingestion), container 56*a*, 56*b* may hold approximately 735 mg of material. Accordingly, the mass of binder 54, additive(s) 60, and plant source 52 may take on a value not greater than approximately 735 mg. If larger sizes of container 56*a*, 56*b* are used, then the mass of the contents of container 56*a*, 56*b* may be increased accordingly.

Container 56*a*, 56*b* may be formed in part or in its entirety of a biodegradable material. Such biodegradable material may be a gelatin and, in particular, a bone gelatin, e.g., from bone of a cow or pig. When such material biodegrades, it may provide nitrogen that can be used as fertilizer by plant source 52 or the plant that grows therefrom.

Further detail regarding biodegradable polymers, which may be used to form container 56*a*, 56*b*, may be found in Shalaby, S. W., Biomedical Polymers, Hanser: New York (1994), which is incorporated herein by reference. In this regard, hydrocolloid solids such as gelatins as well as variations of gelatin (representing a wide range of permeability and hardness), including nitrogen-enriched, protein-based liquid-in-solid colloids including gluten-based or vegetable protein materials, may be used. Carbohydrate-based liquid-in-solid hydrocolloids such as pectins as in jelly, carrageenan from sea weed, agar-agar, etc. may also be used but, as they contain little nitrogen when purified, are not as preferable as protein-based liquid-in-solid colloid materials.

It is noted that biodegradable polymers, including hydrocolloid solids such as gelatins, with hydrolyzable chemical bonds, have been used extensively for biomedical, pharmaceutical, agricultural, and packaging applications (e.g., medical devices, controlled-drug-release applications) and have been shown to be biocompatible, processable, sterilizable, and capable of controlled stability or degradation in response to biological conditions. For example, polyesters based on polylactide (PLA), polyglycolide (PGA), polycaprolactone (PCL), and their copolymers have been extensively employed as biomaterials. Degradation of these materials yields the corresponding hydroxy acids, making them safe for agricultural use.

Container 56*a*, 56*b* may be in part or in its entirety water-permeable. This property permits water or moisture to penetrate the container and the contents of the container. As discussed below, this penetration of water or moisture to the container contents serves to effect release of water and/or additive 60 (e.g., fertilizer, pesticide) from binder 54, for uptake by plant source 52 or the plant that grows therefrom. This penetration of water or moisture may be controlled, e.g., by controlling the amount of water or moisture available to container 56*a*, 56*b*. In this way (by controlling the penetration of water or moisture), the amount, time and/or rate of the release of water and/or additive may be controlled, so as to promote optimized and uniform germination, growth and yield. In addition, the water-permeability of container 56*a*, 56*b* may serve to promote biodegradation of the container 56*a*, 56*b*, as water or moisture may promote this biodegradation.

According to some embodiments, container 56*a*, 56*b* may be coated with oil. (Unless otherwise indicated herein, the term "coat" is used to mean coating the exterior surface of the indicated object.) In this regard, a mineral oil, a light weight oil, or other oils may be used. The oil coating creates a barrier that prevents or hinders water from coming into contact with container 56*a*, 56*b*. This prevents or hinders degradation or decomposition of container 56*a*, 56*b*. So long as the oil coating remains on container 56*a*, 56*b*, the degradation or decomposition thereof is delayed. This in turn delays release of water and/or additive(s) 60 from binder 54, as the oil coating likewise prevents or hinders water or moisture from penetrating the contents of container 56*a*, 56*b*. Other ways of delaying the release of water and/or additive(s) 60 from binder 54 are described below, and further details pertaining, in general, to controlling this release are provided below.

The instant description continues with reference to FIG. 5A, it being understood, as noted, that the content of FIG. 5B is in significant part identical to that of FIG. 5A and, accordingly, the following description is in at least certain respects applicable also to FIG. 5B. Where appropriate, specific reference will be made to FIG. 5B or components illustrated therein.

Medium 54 may comprise a growing medium, a binder, or both. In this regard, medium 54 may comprise two separate substances, one a growing medium and one a binder. It is also possible for medium 54 to comprise a single substance that is both a growing medium and a binder.

Where medium 54 is a growing medium, growing medium 54 may be organic, i.e., be composed of organic matter; inorganic, i.e., composed of inorganic matter; or partly organic and partly inorganic, i.e., composed of both organic matter and inorganic matter. More particularly, growing medium 54 may be soil, peat moss, etc.

Medium 54, whether binder or growing medium, may be non-adherent, i.e., may be of such a character as not to adhere to plant source 52. This may prevent or reduce the extent to which binder 54 and/or additive(s) 60 directly contact plant source 52. (For the case in which medium 54 is a binder) this in turn facilitates, or prevents/reduces interference with, the controlled release of water and/or additive(s) 60 from binder 54 (as described below, additive(s) 60 may be bound to and subsequently released from binder 54).

Another way in which such direct contact between plant source 52, on the one hand, and medium 54 and/or additive(s) 60, on the other hand, may be prevented or reduced, is by disposing medium 54 in container 56a, 56b in such a way that medium 54 does not completely surround plant source 52, as illustrated in FIGS. 5A and 5B, where plant source 52 (e.g., a seed) is disposed for the most part on top of medium 54 with perhaps some settling of plant source 52 into medium 54. In this arrangement, even if medium 54 is not non-adherent, direct contact between plant source 52, on the one hand, and medium 54 and additive(s) 60, on the other hand, is reduced. To be sure, it is also possible to employ an arrangement in which medium 54 completely surrounds plant source 52; such an arrangement is shown, e.g., in FIG. 1 (medium 14 completely surrounds seed 12).

As mentioned, medium 54 may be a binder. A binder is a substance that is capable of holding or anchoring one or more other materials in it or to it. According to embodiments of the present disclosure, medium 54 may be a binder that has certain further properties that are not necessarily had by all binders. A first such property is that the binder is also capable of releasing the held or anchored material(s), e.g., under certain conditions, at a later time, or at a slower rate than the rate at which the material(s) was (were) absorbed. Release of the held or anchored material(s) may make the held or anchored material(s) available to the plant source (e.g., available for uptake by the plant source), whereas prior to their release the held or anchored material(s) may be unavailable to the plant source and incapable of affecting the plant source. A second such property is that the rate, extent(s), and/or time(s) of release of the held or anchored material(s) may be controlled by causing certain conditions to be satisfied or preventing them from being satisfied, which may be accomplished, e.g., by regulating, modifying, or manipulating the environment of the binder. A third such property is that the binder may be non-adherent, that is, not operable to adhere to materials adjacent to it (e.g., the plant source). This property may play a role in rendering the held or anchored material(s) incapable of affecting the plant source so long as the material(s) remain(s) held or anchored.

(For convenience, the binder of embodiments of the disclosure may be referred to as binder 54.) According to embodiments of the disclosure, the binder 54 may comprise any of the following: polyacrylamide, rice, a hydrogel (which may be acrylamide-based), a superabsorbent polymer, sodium bicarbonate (baking soda; $NaHCO_3$), corn starch, or compost. Alternatively, binder 54 may comprise one or more other materials. In the case where binder 54 is polyacrylamide, binder 54 may comprise pulverized or ground crystals of polyacrylamide. In the case where binder 54 is rice, binder 54 may comprise pulverized or ground rice. Polyacrylamide is available commercially as Miracle-Gro® Water Storing Crystals.

Some or all of the above-mentioned binder materials are hydrophilic and hence may be capable of retaining an enormous amount of water, for example, several hundred times their own weight in water. The retained water may be slowly released from the binder. Accordingly, it may be said that binder 54 is operable to retain water and to limit the release of the retained water. Increasing the moisture content of the environment of binder 54 (e.g., increasing the relative humidity of the air surrounding binder 54, or increasing the moisture content of a growing medium in contact with or in the vicinity of binder 54) may increase the rate of release of retained water from binder 54. Accordingly, it may be said that binder 54 is operable to retain water and to release the water at a variable rate depending on the moisture content of the environment of binder 54, and it may further be said that the release of water from binder 54 may be controlled by an operator. In the case of polyacrylamide, when it is dry it takes the form of crystals, whereas after having absorbed much water, it takes the form of a gel. It is also noted that when binder 54 takes in water it swells, and when it releases water it shrinks. Where binder 54 is in a soil or the like growing medium, this swelling and shrinking of binder 54 may serve to break up the soil, i.e., to reduce soil compaction.

As mentioned, agricultural system 50a of FIG. 5A may further include one or more additives 60. Additive(s) 60 may be bound to binder 54, such that binder 54 anchors or holds the additive(s) 60. The binding of additive 60 to binder 54 may occur as follows. Additive 60 may be provided in a form that is powdered, granulated, ground, crushed or the like, or in another form. The additive 60 may be added to water. Binder 54 (which may initially be in crystal form) may be caused to absorb the water containing additive 60, e.g., by placing binder 54 in (contact with) the water. The absorption of water may cause binder 54 to take the form of a gel. Binder 54 may then be dried, e.g., by heating, so that water is removed from binder 54, e.g., by evaporation. The drying of binder 54 may cause binder 54 to take the form of crystals. In this way, additive 60 may be bound (held, anchored) to binder 54. The binding of additive 60 to binder 54 may be performed prior to the disposing of binder 54 and additive 60 in container 56a; thus, binder 54 together with additive 60 already bound thereto may be placed in container 56a.

Later, at a time when binder 54 with additive 60 bound thereto is contained in container 56a, water may be added to binder 54, e.g., by increasing the moisture content of the environment of binder 54 (e.g., increasing the relative humidity of the air surrounding binder 54, or increasing the moisture content of a growing medium in contact with or in the vicinity of binder 54). Binder 54 may subsequently release water and additive 60 to its environment. As a result, additive 60 is rendered available for uptake and use by plant source 52. Increasing the moisture content of the environment of binder 54, and hence of binder 54, may increase the rate of release of water and additive 60 from binder 54.

Accordingly, it may be said that binder 54 is operable to retain additive 60 and to limit the release of additive 60; that binder 54 is operable to retain additive 60 and to release additive 60 at a variable rate depending on the moisture content of the environment (e.g., air, growing medium) surrounding binder 54; and that the release of additive 60 from binder 54 may be controlled by an operator.

By these processes of binding additive(s) 60 to binder 54 and subsequently causing the release of the bound additive(s) 60 from binder 54, additive(s) 60 may be supplied to plant source 52 (and to the plant that grows therefrom) in a controlled, time-released manner. (Stated in other words, it may be said that binder 54 is operable to time-release additive 60, and that additive 60 is capable of being time-released.) That is, the time at which an additive 60 is made available to plant source 52 (and to the plant that grows therefrom) may be controlled (e.g., delayed by an amount of time that may be controlled, hence selected), and the amount or rate (amount/time) of an additive 60 supplied to plant source 52 (and to the plant that grows therefrom) may be controlled, hence selected. In this way, additives 60 may be supplied to plant source 52 (and to the plant that grows therefrom) in optimal amounts and at optimal times or according to optimal rates. This may improve germination rates, growth, growth rates, and yield and may render germination times and growth rates relatively uniform. In this regard, also, uniform amounts of additive(s) 60 may be supplied to multiple containers 56a containing the same species of plant source 52 to promote uniformity of germination time and growth rate.

Further, a supply of additive(s) 60 sufficient for part or all of the life cycle of plant source 52 and the plant that grows therefrom may be provided in container 56a. This is possible because the additive(s) 60 are not in direct contact with plant source 52, due to one or more of the following reasons: (1) additive(s) 60 is (are) bound to binder 54 and hence not initially available to plant source 52; (2) binder 54 containing additive(s) 60 may have the property of not adhering to plant source 52; and (3) plant source 52 may be disposed atop binder 54 rather than being surrounded by binder 54. If such a large supply of additive(s) 60 were initially in direct contact with or available for uptake by plant source 52, the additive(s) 60 might well harm or kill plant source 52. The provision of such supply of additive(s) 60 sufficient for all or part of the life cycle of plant source 52 and the plant that grows therefrom means that it is not necessary to apply additives by conventional means, e.g., distributing additives by a tractor to an entire field. This conserves additives, as well as the time, labor and cost of applying additives, and reduces pollution from additives and pollution of the process of applying additives to (the environment of) the plant sources 52 and the plants that grow therefrom. It also eliminates the need for human operators to come into contact with harmful additives. Finally, it should be noted that it is the container 56a that permits such large (lifetime or part lifetime) supply of additives to be provided at the time of planting and in a manner that avoids the costs and dangers of traditional application of the additives. In the prior art methods of coating or pelletizing a seed with a growing medium and/or additives, the growing medium and additives may come into direct contact with the seed. Accordingly, these prior art methods preclude provision of such a large supply of additives. In the prior art method of planting the seed directly in the ground (or another growing medium), the following problems may occur: again, excess amount of the additives may come in contact with or become available for uptake by the seed, which may harm or kill the seed; the supply of additives provided at planting may not remain with the seed/plant (since the additives are not contained by a container), but may be effectively rendered unavailable to the seed/plant; and the additives must be applied conventionally, which may require human contact or handling of harmful additives.

As described above, the release of water and/or additive(s) 60 from binder 54 for use by plant source 52 may be controlled by regulating or adjusting the moisture content of the environment surrounding binder 54, e.g., the moisture content of a (e.g., growing) medium in which the binder 54 may be disposed or the relative humidity of the air surrounding the binder 54. In this regard, it may be noted that container 56a, 56b may include air in interior region 51a, 51b, as illustrated in FIGS. 5A and 5B. (Reference numerals 51a, 51b may be understood as referring also to air, which occupies the portion of interior region 51a, 51b that is not occupied by medium 54, additive(s) 60 and plant source 52.) The relative humidity of this air may be regulated or adjusted in order to control the release of water and/or additive(s) 60 from binder 54 so as to make the water and/or additive(s) 60 available to plant source 52. Alternatively or in addition, the moisture content of the binder 54, or of a growing medium contained in container 56a, 56b in addition to binder 54, may be regulated or adjusted to effect such control. Where container 56a, 56b contains air, it follows that medium (e.g., binder) 54, additive(s) 60 and plant source 52 do not occupy the entirety of interior region 51a, 51b, again as illustrated in FIGS. 5A and 5B. To be sure, it is possible to employ an arrangement in which medium (e.g., binder) 54, additive(s) 60 and plant source 52 do occupy the entirety of interior region 51a/51b, and interior region 51a/51b does not contain air.

It should be noted that the presence of container 56a, 56b improves the ability to control the release of water and additive(s) 60 from binder 54, as compared to an arrangement in which container 56a, 56b is omitted and the contents thereof are simply planted in a growing environment. Container 56a, 56b provides a microenvironment that is relatively closed off from the larger ambient environment. This permits the moisture content and/or relative humidity of the contents of container 56a, 56b to be controlled and adjusted with a greater degree of accuracy and precision, and with a greater degree of effectiveness and reliability. The controlled microenvironment within container 56a, 56b is relatively stable. If the contents of container 56a, 56b were simply planted in a growing environment, they would take moisture from the air of the growing environment, which may trigger or hasten germination and thus eliminate the possibility, or significantly reduce the degree, of such control of the moisture content/relative humidity. Further, absent container 56a, 56b, the contents thereof would be more subject to changes in the ambient environment, which could adversely affect the ability to control moisture content/relative humidity; and even changes in remote environments could impinge on the local environment of binder 54/additive(s) 60/plant source 52 in an untimely manner with similar effect.

It should be noted that the presence of container 56a, 56b also permits additives that are harmful to human beings (e.g., pesticides) to be applied to plant source 52 and the plant that grows therefrom, without requiring human contact with the harmful additives. The harmful additives may be contained in the container 56a, 56b, which may be sealed (e.g., closed, 56a) such as to prevent contact with the person performing the planting. Accordingly, it is not necessary for a person to apply the harmful additive to the ground (or other growing medium) in which the plant source is planted or to the plant that grows therefrom, nor is it necessary to handle the harmful additive.

Additive(s) 60 may include at least one of the following: an additive that promotes germination, growth or yield; an additive that promotes pest resistance; and an additive that promotes stress resistance. The term "growth" may refer to growth of a plant or any part thereof, whether above or below ground. The term "promotes germination" includes both improving germination rate and decreasing germination time. The term "promotes growth" includes both increasing magnitude of growth and increasing rate of growth.

Additive(s) 60 may include at least one of the following: a fertilizer, a pesticide, a hormone, a steroid, or a fungus capable of mycorrhizal association with a plant source or the plant that is to grow from the plant source. The term "pesticide" is used in a broad sense to encompass substances and products that protect plants from damaging influences such as weeds, plant diseases, insects, etc. As such, the term "pesticide" encompasses (e.g., biological or chemical) agents that deter, incapacitate, kill, or otherwise discourage pests. Accordingly, the term "pesticide" includes, e.g., herbicides, insecticides, insect growth regulators, nematicides, insect repellents, animal repellents, fungicides, antimicrobial agents, etc. Some repellants that may be used as additives 60 are aromatic repellants, brassica grass natural nematode repellant, and predator urine, which may be polymerized into crystal form. A hormone that may be used as an additive 60 is gibberellic acid. The preceding listings of specific additives 60 are of course not limiting. Additive 60 may comprise any of a wide range of biodegradable materials.

Additive(s) 60 employed may be selected on a customized basis, for example, according to the specific type (e.g., species) of plant source 52 or the specific planting/growing environment (e.g., the geographic region, the climate, the soil type, the type of field, the types of neighboring plants, the types of prevalent insects or other animals, pathogens, plant diseases, etc.).

The amount (quantity) of an additive 60 employed may be selected so that the additive 60 is exhausted by the time suitable for harvesting part or all of the plant that is to grow from plant source 52 since, at this time, there may no longer be a need for the additive 60. This situation may apply for example in the case of harvesting vegetables from annual plants. Of course, where the plant continues to be of value after harvesting time, this situation may not apply. Selection of such appropriate amounts of additives 60 in appropriate circumstances may avoid waste of resources and pollution.

With respect to controlling the time at which additives 60 are released to plant source 52 and the plant that grows therefrom (or controlling the amount of time by which such release is delayed), a wax may be applied to binder 54 such as to coat binder 54 with the wax. The wax, so long as it remains on binder 54, prevents or hinders water from contacting binder 54. This in turn delays the release of water and additive 60 from binder 54, thus delaying application of additive 60 to plant source 52. Such delay may serve to delay germination, or to lengthen a crop cycle, for example, or may be useful for plants having a longer germination time or life cycle.

Similarly, a wax may also be applied to additive 60 such as to coat additive 60 with the wax, which may achieve a similar effect, delaying release of additive 60.

With respect to wax coatings on binder 54 or additive 60, the thickness of the coat of wax applied may be adjusted so as to effectively adjust the amount of time delay of application of the additive 60.

According to some embodiments, the one or more additives 60 comprise two fertilizer additives (say, a first fertilizer additive and a second fertilizer additive), and the two fertilizer additives are coated with different amounts (e.g., thicknesses) of wax, respectively (say, the first fertilizer additive is provided with a thin coating of wax and the second fertilizer additive is provided with a thick coating of wax). In this case, the first fertilizer additive will be applied to the plant source 52/plant that grows therefrom, and may be used up, before the second fertilizer additive is applied to the plant source 52/plant that grows therefrom. This procedure can be extended to employ more than two fertilizer additives and/or more than two different thicknesses of the wax coating. By using such a procedure, the supply of fertilizer can be made to last for a longer portion, or for the entirety, of the growth cycle/lifetime of the plant. In this procedure, the two fertilizer additives may be the same kind of fertilizer or different kinds of fertilizer. As an example of the latter, a first fertilizer additive may be such as to provide phosphorous while a second fertilizer additive may be such as to provide nitrogen, since phosphorous is particularly effective at promoting growth of foliage while nitrogen is particularly effective at promoting growth of fruit. This procedure may also be employed not only with fertilizer, but also with pesticide or other additives. In addition to reducing cycle time and increasing yield, this procedure may also reduce the need for crop rotation, by reducing depletion of nutrients from the soil.

According to some embodiments, for a first batch of containers (each containing binder 54, additive 60 and plant source 52) the additives 60 (e.g., fertilizer) may be unwaxed and for a second batch of containers (each containing binder 54, additive 60 and plant source 52) the additives 60 may be waxed. By this procedure, it is possible to achieve two successive release times for the additives 60: a first, early release time for the first batch, having the unwaxed additive 60, and a second later release time for the second batch), having the waxed additive 60. In turn, the two batches may have two successive germination times, harvest times, etc. Again, this procedure may be extended to more than two batches, with different batches having wax coatings of different thicknesses.

According to some embodiments, a wax used to coat binder 54 or additive 60 may be beeswax. One advantage of beeswax is that it is a natural, organic substance, with the attendant environmental and health benefits (e.g., reducing pollution, promoting safety of the food supply). Another advantage of beeswax is that it may serve as an antimicrobial agent. As such, the beeswax may delay or slow down the action of fertilizer, which, as described above, may be desired. This is because fertilizer works to promote plant growth through a process in which microbes act upon the fertilizer to release the nutrients (e.g., nitrogen), which can then be taken up by a plant. The antimicrobial agent thus slows down this process. Accordingly, beeswax may be used as an agent to control the timing of the application of fertilizer. This control is effected by a different mechanism than the control mechanisms described above, which operate by controlling the amount of the additive 60, the amount of moisture in the environment of binder 54 and additive 60, and the amount of wax applied, respectively. Of course, multiple control mechanisms may be employed together.

It should be noted that, particularly for the purpose of serving as an antimicrobial agent, the beeswax may simply be used as additive 60 itself, rather than applying the beeswax as a coating on binder 54 or additive 60. Further in this regard, another antimicrobial agent, other than beeswax, may alternatively or additionally be used as additive 60. Also, another wax, other than beeswax, may be used as additive 60.

According to some embodiments, where additive 60 comprises an antimicrobial agent, binder 54 may comprise baking soda (sodium bicarbonate, $NaHCO_3$), corn starch, or baking powder.

According to some embodiments, additive 60 may comprise iron. The iron may be in the form of iron shavings. When the iron is in container 56a, which has been planted in the ground (or more generally, in a growing medium), the iron may rust, e.g., catalyzed by moisture. The chemical reaction of the iron rusting releases heat and $CO_2$. The heat released may cause a temperature increase of 2-3 degrees Fahrenheit, which may last for several days, as the surrounding ground or growing medium may help retain the heat. This heat may serve to protect plant source 52 or the plant that grows therefrom from frost or other conditions of excess cold. The $CO_2$ may be used by the plant source 52/plant.

Another way of providing heat to plant source 52 inside container 56a, 56b is to coat the interior surface 55a/55b of the container 56a/56b with oil and add pine straw to the contents of the container 56a/56b. Another way of providing heat to plant source 52 inside container 56a, 56b, is to provide a sugar (or a carbohydrate) and yeast in container 56a, 56b, such as will result in a fermentation process under the appropriate conditions. The fermentation again generates heat and $CO_2$.

According to some embodiments, additive 60 may be a material operable to adjust the pH of binder (or growing medium) 54. The pH may be adjusted to suit the specific type (e.g., species) of plant source 52 or the specific planting/growing environment (e.g., the geographic region, the climate, the soil type, the type of field, the types of neighboring plants, the types of prevalent insects or other animals, pathogens, plant diseases, etc.). In this regard, optimal pHs for different types of plants are given in Table 2 below. As examples of additives 60 operable to adjust the pH, citric acid may be used to lower the pH (render more acidic) and ash may be used to increase the pH (render more basic). An example of a binder 54 that may be used with an additive 60 comprising a material operable to adjust the pH of the binder is compost. Where the additive 60 comprises a material used to render the binder 54 more acidic, iron (e.g., in the form of shavings) may also be included in container 56a. The acidic material of additive 60 may serve to promote the exothermic iron rusting reaction. In this arrangement, it is also possible to wax the binder 54 so as to delay the release of the acid in order to control (/delay) the time at which the reaction starts.

TABLE 2

| Optimum pH Ranges Selected Plants | |
|---|---|
| Flowers | |
| African violet | 6.0-7.0 |
| Alyssum | 6.0-7.5 |
| Begonia | 5.5-7.0 |
| Calendula | 5.5-7.0 |
| Carnation | 6.0-7.5 |
| Chrysanthemum | 6.0-7.5 |

TABLE 2-continued

| Optimum pH Ranges Selected Plants | |
|---|---|
| Geranium | 6.0-8.0 |
| Shrubs | |
| Almond, flowering | 6.0-7.0 |
| Azalea | 4.5-5.0 |
| Barberry, Japanese | 6.0-7.5 |
| Burning bush | 5.5-7.5 |
| Butterfly bush | 6.0-7.5 |
| Boxwood | 6.0-7.5 |
| Camellia | 4.5-6.5 |
| Daphne | 6.5-7.5 |
| Gardenia | 5.0-6.0 |
| Holly, American | 5.0-6.0 |
| Holly, Japanese | 5.0-6.5 |
| Ivy | 6.0-8.0 |
| Lilac | 6.0-7.5 |
| Leucothoe | 4.5-6.0 |
| Magnolia, Southern | 5.0-6.0 |
| Magnolia, sweetbay | 4.0-5.0 |
| Mountain Laurel | 4.5-6.0 |
| Pachysandra | 4.5-5.5 |
| Picris | 5.0-6.0 |
| Quince, flowering | 6.0-7.0 |
| Rhododendron | 4.5-6.0 |
| Rose, hybrid tea | 5.5-7.0 |
| Snowball bush | 6.5-7.5 |
| Fruits/Nuts | |
| Apple | 5.0-6.5 |
| Apricot | 6.0-7.0 |
| Blueberry, high bush | 4.0-5.0 |
| Cherry, sour | 6.0-7.0 |
| Cherry, sweet | 6.0-7.5 |
| Crab apple | 6.0-7.5 |
| Peach | 6.0-7.5 |
| Raspberry, red | 5.5-7.0 |
| Strawberry | 5.0-6.5 |
| Walnut, black | 6.0-8.0 |
| Trees | |
| Ash, white | 6.0-7.5 |
| Aspen, American | 3.8-5.5 |
| Beech | 5.0-6.7 |
| Birch, European | 4.5-6.0 |
| Crepe Myrtle | 5.0-6.0 |
| Dogwood | 5.0-7.0 |
| Spruce, Colorado | 6.0-7.0 |
| Sycamore | 6.0-7.5 |
| Fir, balsam | 5.0-6.0 |
| Fir, Douglas | 6.0-7.0 |
| Hemlock | 5.0-6.0 |
| Maple, sugar | 6.0-7.0 |
| Oak, black | 6.0-7.0 |
| Oak, pin | 5.0-6.5 |
| Oak, white | 5.0-6.5 |
| Pine, loblolly | 5.0-6.0 |
| Pine, white | 4.5-6.0 |
| Vegetables | |
| Asparagus | 6.0-8.0 |
| Beets | 6.0-7.5 |
| Broccoli | 6.0-7.0 |
| Cabbage | 6.0-7.5 |
| Carrot | 5.5-7.0 |
| Cauliflower | 5.5-7.5 |
| Celery | 5.8-7.0 |
| Cucumber | 5.5-7.0 |
| Lettuce | 6.0-7.0 |
| Muskmelon | 6.0-7.0 |
| Onion | 5.8-7.0 |
| Potato | 4.8-6.5 |
| Rhubarb | 5.5-7.0 |
| Spinach | 6.0-7.5 |
| Tomato | 5.5-7.5 |

Plant source 52, although illustrated in FIGS. 5A and 5B schematically in a shape resembling that of a seed, may be any entity capable of growing into a plant or into a portion of a plant, or a part of such entity. Accordingly, plant source 52 may be any of the following: a seed; a bulb; a tuber; a seedling; a plant; one or more plant cells capable of growing into a plant or into a portion of a plant; or a part of any of the foregoing. Multiple plant sources 52 may be contained in container 56*a*. In such case, the multiple plant sources 52 may be of the same type, e.g., multiple seeds, or of different types, e.g., a seed and plant cells. Where multiple plant sources 52 of the same type are used, they may be of the same species (e.g., multiple apple seeds) or different species (e.g., an apple seed and a pear seed). Where plant source 52 is a seed, the seed may be either dormant or non-dormant. An example of a tuber, or rather a part thereof, is an eye of a potato. The term plant "cells" includes portions of plants having a level of organization higher than that of cells, e.g., tissue. Where plant source 52 is plant cells capable of growing into a plant or into a portion of a plant, such cells may be, e.g., undifferentiated plant tissue or differentiated plant tissue. An example of undifferentiated plant tissue is meristematic tissue. Examples of differentiated plant tissue are a branch, a shoot, a cutting, etc.

Plant source 52 may be vulnerable to harm or destruction due to various destructive conditions or forces, e.g., insects, birds, pathogens, adverse weather conditions, competing plants in the vicinity, adverse effects caused by human intervention in the natural environment, etc.). Among the various different kinds of plant sources 52 (seed, bulb, tuber, etc.), certain ones may be more vulnerable in general, or more vulnerable to certain kinds of threats, than others. For example, seeds which have a protective shell may be less vulnerable than meristematic tissue. In view of this vulnerability, plant source 52 may be protected in various ways.

Initially, it will be noted that containers 56*a* (FIG. 5A) and 56*b* (FIG. 5B) provide plant source 52 with a degree of protection against the threats noted above. In that regard, closed container 56*a* (FIG. 5A) provides a higher degree of protection than open container 56*b* (FIG. 5B). As a further degree of protection, container 56*a*, 56*b* may be made sterile prior to disposal therein of binder 54, additive(s) 60 and plant source 52. This may be particularly valuable where plant source 52 is meristematic tissue or the like. The protection provided by container 56*a*, 56*b* itself, and by its being made sterile, may also serve to protect additive(s) 60, which may be particularly useful depending on the identity of additive(s) 60.

Plant source 52 may additionally be protected by providing a preservative, either as additive 60 or as another component, in container 56*a*, 56*b*. In this context, a preservative is a substance that promotes preservation of plant source 52.

Plant source 52 may additionally be protected by coating plant source 52 with wax.

The above-described measures of protection may permit planting certain plant sources (e.g., lacking a protective shell) in the field that otherwise could successfully be planted only in a laboratory.

According to some embodiments, container 56*a*, 56*b* may further include a radio frequency identification (RFID) tag 501. The RFID tag 501 may be secured to the container 56*a*, 56*b* or disposed in the container 56*a*, 56*b*. If disposed in the container 56*a*, 56*b*, the RFID tag 501 may be secured to one or more of the contents of container 56*a*, 56*b*. The RFID tag 501 may permit tracking of containerized units/plants that grow therefrom (hereafter referred to as "units/plants"). The term "containerized unit" is used to refer to a container 56*a* or 56*b* and its contents (medium 54, additive(s) 60, plant source 52, and any other contents). Performance of units/plants as measured along various indices such as discussed herein may be measured. Such performance may be measured for individual units/plants and for groups of units/plants. Aggregate performance may be measured per specific variables (e.g., per plant species) and combinations of variables (e.g., per plant species in given geographical region/climate/soil/pathogen environment). Records of such performance may be made and this data may be used to refine the agricultural system 50*a*/50*b* so as to improve performance. For example, amounts of contents (e.g., additives 60) put in containers 56*a*/56*b* and rates/timings of release of water and/or additives 60 may be adjusted. As another example, growing environments may be adjusted, or plants of particular species may be relocated to different growing environments.

According to some embodiments, container 56*a*, 56*b* may have one or more indicia (not illustrated). The indicium 500 may be perceptible from the exterior of container 56*a*, 56*b*. The indicium 500 may be, for example, visual, tactile, or of another type. Examples of visual indicia include color-coding, imprinted information, bar codes, etc. An example of tactile indicia would be information encoded in a tactile code like Braille. An example of another type of indicia would be magnetically coded information. The indicia may be perceptible by human beings and/or by machine.

The indicium 500 may correspond to a particular type of one or more of the following: container 56*a*/56*b*, medium 54 (binder and/or growing medium), additive(s) 60, plant source 52, other contents of container 56*a*/56*b*, or the environment in which container 56*a*/56*b* containing the aforementioned contents is to be planted. The term "particular type" of an object may refer to a particular characteristic or property of the object. Types of container 56*a*/56*b* may refer to container configuration (e.g., closed versus open), container shape, container size/volume, number of pieces of which the container is formed, material(s) of which the container is formed, degree of water permeability of container, or any other feature of container 56*a*/56*b*. Types of medium 54 may refer to type of medium 54 (e.g., binder, growing medium), particular substance used as medium 54, amount of medium 54, moisture content of medium 54, or any other feature of medium 54. Types of additive(s) 60 may refer to type of additive(s) 60 (e.g., fertilizer, pesticide, etc.), particular substance used as additive(s) 60, amount of additive(s) 60, thickness of wax coating of additive(s) 60, or any other feature of additive(s) 60. Types of plant source 52 may refer to type of plant source 52 (e.g., seed, bulb, tuber, etc.), plant species and/or variety, or any other feature of plant source 52. Types of environment may refer to geographic region, climate, soil type, type of field, types of neighboring plants, types of prevalent insects or other animals, pathogens, or plant diseases, or any other feature of the environment in which container 56*a*/56*b* containing the aforementioned contents is to be planted. Indicia may also be used to indicate customized contents of containers 56*a*, 56*b*.

The indicia on containers 56*a*, 56*b* may be used to facilitate the tracking, monitoring, measuring of performance, recordkeeping, and data collection and analysis such as described above with reference to the RFID tags. The indicia may also be used to facilitate organization and increase efficiency in the processes of manufacturing containers 56*a*, 56*b*, preparing containers 56*a*, 56*b* (e.g., filling containers 56*a*, 56*b* with contents), and planting containers 56*a*, 56*b*. In view of the wide variety possible in respect of the various components of agricultural system 50*a*, 50*b* (e.g., containers 56*a*, 56*b*, medium 54, additive(s) 60, plant source 52) and in respect of the context of use of agricultural system 50a, 50b (e.g., (the myriad elements/aspects of) the environment in which container 56a/56b is to be planted), the use of indicia on containers 56a, 56b in the service of the above-mentioned or other functions may be very valuable.

Figure 5C:
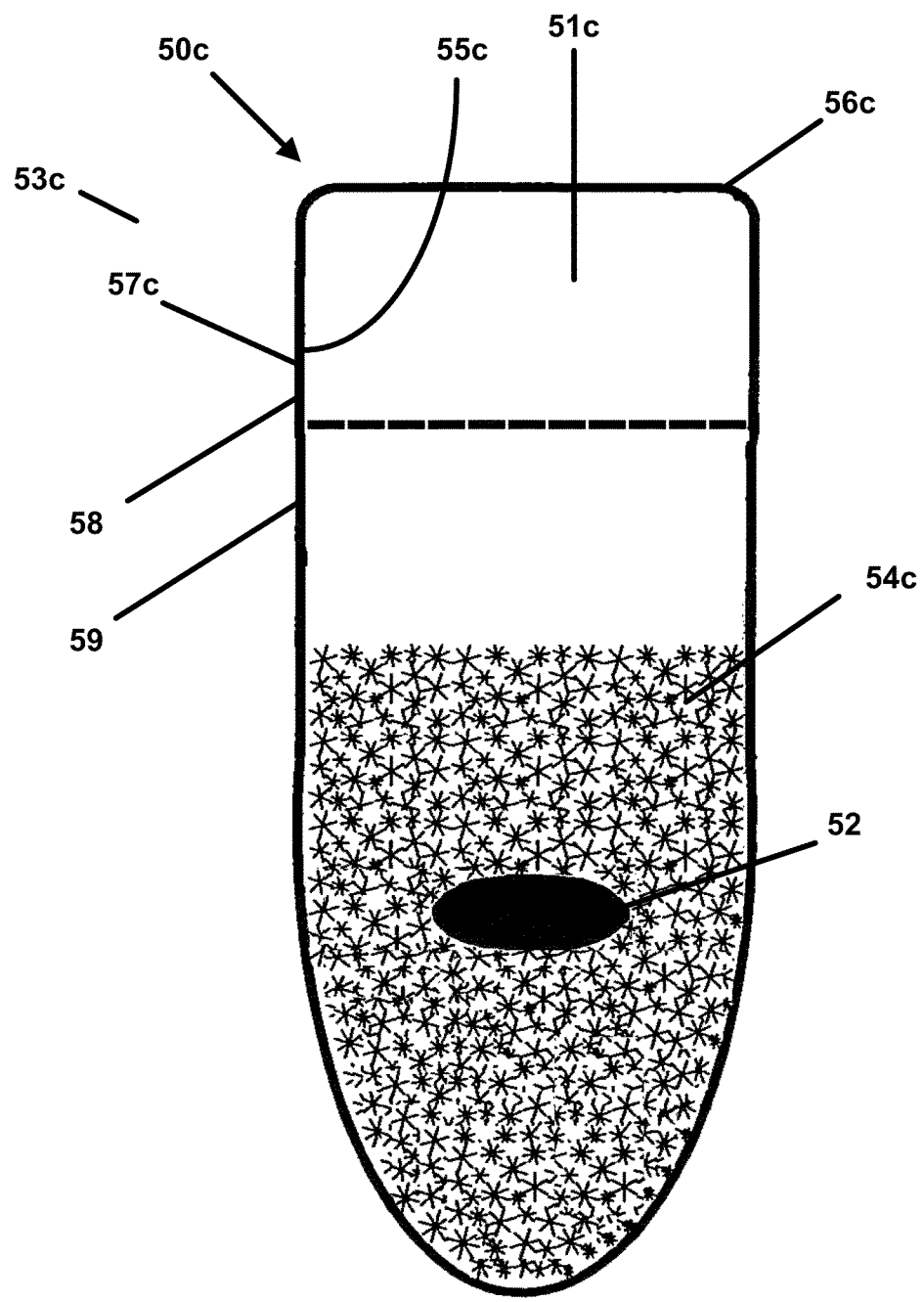

Turning to FIG. 5C, a more detailed description of the second set of further embodiments will now be provided.

FIG. 5C shows an agricultural system 50c including a container 56c, pollen 54c, and a plant source 52. While container 56c is illustrated as identical to container 56a (i.e., closed, two pieces), it is possible to employ for the second set of further embodiments a container such as container 56b (open, one piece), or any other variety of container such as described above with reference to the first set of further embodiments.

As illustrated in FIG. 5C, agricultural system 50c is in some respects similar to, and in some respects different from, agricultural system 50a shown in FIG. 5A. Agricultural system 50c will generally be described only to the extent of explaining the differences between it and agricultural system 50a. Elements in FIG. 5C identified by reference numbers 51c, 52, 53c, 55c, 56c, 57c, 58 and 59 are identical to their like numbered counterparts in FIG. 5A and hence are not described again, as these elements have already been described with reference to FIG. 5A.

As illustrated in FIG. 5C, pollen 54c and plant source 52 are disposed in container 56c. Plant source 52 may be completely surrounded by pollen 54c, as illustrated, or not. For example, plant source 52 may be disposed atop pollen 54c in the manner in which plant source 52 is disposed atop medium 54 as illustrated in FIGS. 5A and 5B. As was the case with agricultural systems 50a and 50b, other variation from the arrangement illustrated in FIG. 5C is possible. For example, in agricultural system 50c container 56c may contain air or not; and pollen 54c and plant source 52 (and any other contents of container 56c, described below) may occupy the entirety of interior region 51c of container 56c or not.

Pollen 54c may stick to or remain with plant source 52 and the plant that grows therefrom. Pollen 54 may be made to be electrically charged to promote its sticking to or remaining with plant source 52 and the plant that grows therefrom. For example, pollen 54c may be given an electrical charge of a polarity opposite to that of plant source 52/the plant that grows therefrom. Pollen 54 may be given a positive electrical charge so as to be attracted to a negatively charged plant source/plant, or a negative electrical charge so as to be attracted to a positively charged plant source/plant. Pollen 54c may be given the electrical charge by using static electricity.

Measures may be taken to preserve or maintain pollen 54c in an active, healthy condition, so that it may last until the stage in the plant's life at which the plant may be pollinated (e.g., when the plant has flowers). One such measure is to apply a coating to pollen 54c. The coating may be ethyl glycol. Other substances may also be used as preservatives to preserve pollen 54c.

Agricultural system 50c may further include in container 56c any of: a growing medium, a binder, additive(s), or other components that may be included in containers 56a or 56b, such as described above. Agricultural system 50c may also include an RFID tag such as described above. In general, the many aspects and variations described above with respect to agricultural systems 50a and 50b are applicable/adaptable to agricultural system 50c.

Agricultural methods according to the first and second sets of further embodiments will now be described. First, agricultural methods according to the first set of further embodiments will be described with reference to the flow charts illustrated in FIGS. 6A, 6B, 6C and 6D. Then agricultural methods according to the second set of further embodiments will be described. Terms used in FIGS. 6A, 6B, 6C, and 6D, and the accompanying description thereof, are to be understood in the same manner as those terms were used and defined in the above description of agricultural systems according to the first and second sets of further embodiments, which description was provided with general reference to FIGS. 5A, 5B and 5C. Whereas the below description of methods is streamlined for convenience, it should be understood that the fuller description of systems provided above is generally applicable, mutatis mutandis, to the methods. Likewise, detail provided in the below description of methods is generally applicable, mutatis mutandis, to the systems.

Figure 6A:
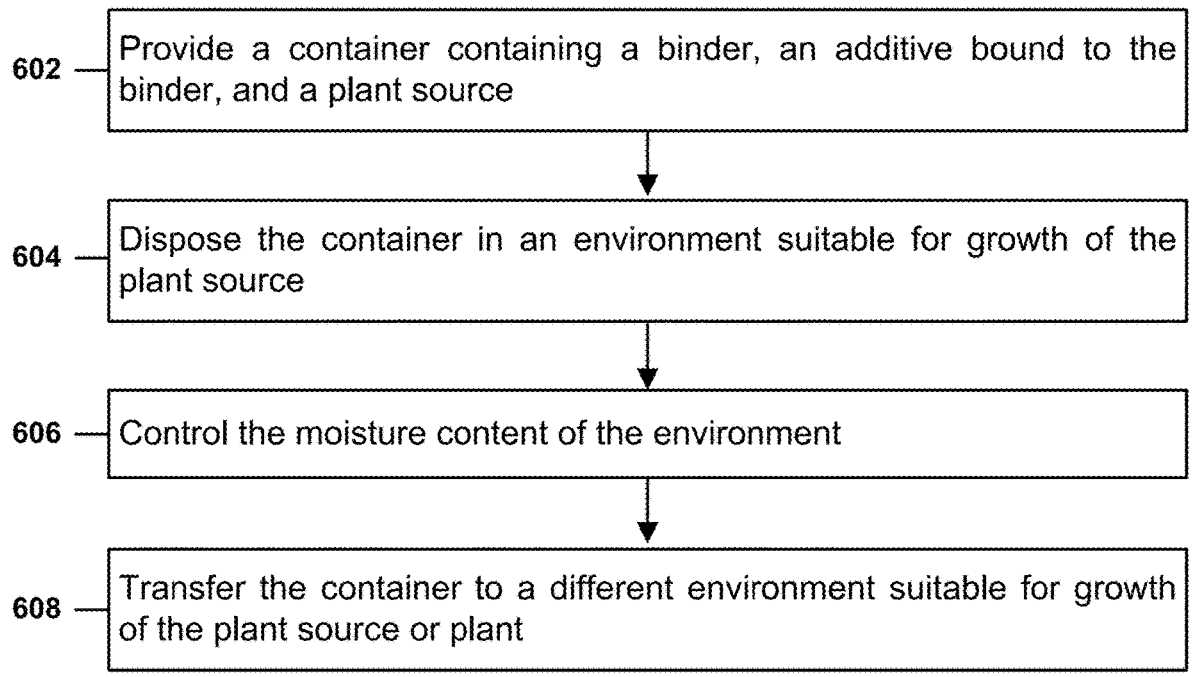
FIGS. 6A, 6B, 6C and 6D are illustrations of flow charts depicting agricultural methods, according to embodiments of the present disclosure.

Agricultural methods according to the first set of further embodiments will now be described with initial reference to FIG. 6A. FIG. 6A illustrates a flowchart depicting method 600A. At step 602 of method 600A, a container is provided, the container containing a binder, an additive bound to the binder, and a plant source. At step 604, the container is disposed in an environment suitable for growth of the plant source. In this context, the term "growth of the plant source" is to be understood as encompassing both germination of the plant source and growth or development toward germination of the plant source. For example, in some embodiments, the container may be planted in an environment for germination of the plant source; in some embodiments, the container may be planted in a first environment for initial growth and development toward germination, then transplanted to a second environment for ultimate germination. Again, in some embodiments, after germination occurs, the container may be moved to a different environment for growth of the plant, whereas in other embodiments, the plant may be grown in the same environment in which germination took place. Other variations on this theme are possible. The term "disposing in an environment" encompasses the case in which the container is disposed in multiple successive environments. The term "environment suitable for growth of the plant source" is to be understood as encompassing even an environment minimally sufficient for growth of the plant source. As one example, an environment which has or is made to have adequate moisture to trigger germination (discussed below) may suffice; it may not be necessary for the environment to include a growing medium (e.g., soil or the like) inasmuch as the container may contain adequate materials serving as a growing medium, etc. Of course, the environment suitable for growth of the plant source may be a natural environment or a non-natural environment. A non-natural environment may be an artificial or man-made environment, such as a greenhouse, or a natural environment that has been altered by human intervention. According to at least one embodiment, the container is disposed in the environment suitable for growth of the plant source by broadcasting the container from an aircraft. In this context, the term "aircraft" is understood to refer to a machine that is able to fly by gaining support from the air, and hence the term "aircraft" is understood to encompass an airplane, a helicopter, a glider, a balloon, a dirigible, a personal air vehicle, a kite, and any other flying vehicle, machine, or apparatus, whether manned or not. According to at least one embodiment, the container is disposed in the environment suitable for growth of the plant source by operation of a planting machine, such as a conventional planter. According to at least one embodiment, the container is manually disposed in the environment suitable for growth of the plant source by a human operator. It will be understood that steps 602 and 604, and even step 604 alone, already constitute a complete method of planting a plant source.

At step 606, the moisture content or relative humidity of the environment is controlled. Step 606 may encompass, for example, controlling the relative humidity of the air within or in the vicinity of the container, or controlling the moisture content of the solid environment (e.g., ground) in the vicinity of the container. More specifically, step 606 may encompass increasing the moisture content or relative humidity of the environment. In this regard, the moisture content or relative humidity of the environment may be increased to at least approximately 16 weight percent. Such increase of the moisture content or relative humidity of the environment may cause the moisture content of the binder to increase to the same or a similar degree. By increasing the moisture content of the binder to such degree, the plant source may be caused to germinate. As an alternative to step 606, the moisture content of the binder may be controlled. More specifically, the moisture content of the binder may be increased. In this regard, the moisture content of the binder may be increased to at least approximately 16 weight percent. As mentioned, by increasing the moisture content of the binder to such degree, the plant source may be caused to germinate. The controlling and increasing of the relative humidity or moisture content may be accomplished by direct human intervention, e.g., adding water or water vapor, or the like, or by indirect human intervention, e.g., placing or planting the container in an appropriate natural environment, where natural events or conditions such as rainfall, weather change over time, or the presence of a body of water may effect the control or increase. It will be noted that it is possible to increase the moisture content or relative humidity of the environment or binder for different containers at different times. For example, the moisture content or relative humidity could be increased for containers planted in a first portion of a field at a first time, and for containers planted in a second portion of a field at a second time, etc. This may permit the availability of a crop for a longer season than would otherwise be feasible, or may serve other purposes.

At step 608, the container is transferred to a different environment suitable for growth of the plant source or of the plant that grows or is to grow therefrom. (The terms "environment suitable for growth of the plant source" should be understood as explained above with respect to step 604.) For example, a container may be planted in a greenhouse (or other artificial environment) initially, as this is a more protective environment and the plant source is more vulnerable; subsequently, after germination, the container may be transplanted to a field (or other natural environment), as the plant is less in need of the protection provided by the greenhouse and more able to withstand the rigors of a natural environment. Of course, in many situations, step 608 is not performed.

Method 600A may of course also be performed where the container contains a medium, e.g., a growing medium, which is not also a binder. In this case, the container may contain an additive or not. The additive need not be bound to the medium.

Figure 6B:
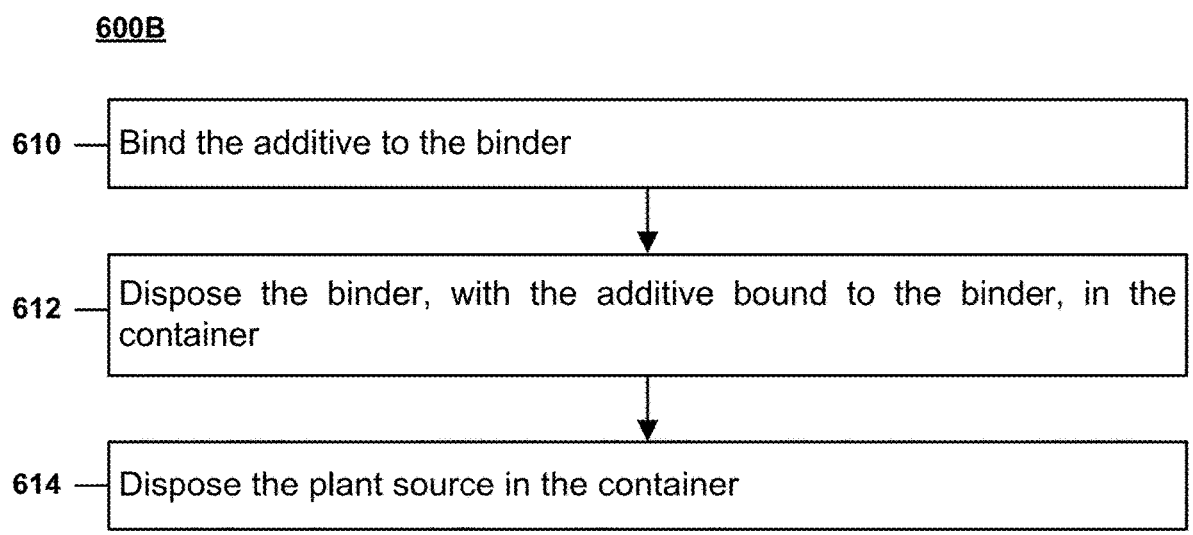

Method 600B will now be described with reference to FIG. 6B. Method 600B may be considered to comprise substeps of, or steps performed prior to, step 602 of method 600A. In method 600B, at step 610, the additive is bound to the binder. (Further explanation of this step is provided below in the description of FIG. 6C.) At step 612, the binder, with the additive bound thereto, is disposed in the container. At step 614, the plant source is disposed in the container. It will be noted that the plant source may be disposed on top of the binder, as illustrated in and described above with reference to FIGS. 5A and 5B. Alternatively, the plant source may be disposed within the binder, in the manner illustrated in FIG. 1 (where seed 12 is disposed within growing medium 14). Where the plant source is disposed within the binder, step 614 may, but need not, be performed in the middle of performing step 612 (the plant source may be disposed in the container after a portion of the binder has been disposed in the container, and then the remaining portion of the binder may be disposed in the container). Thus, as noted below, at least some steps of the agricultural methods may be performed in an order other than the order illustrated in the flowcharts of FIGS. 6A-6D.

Figure 6C:
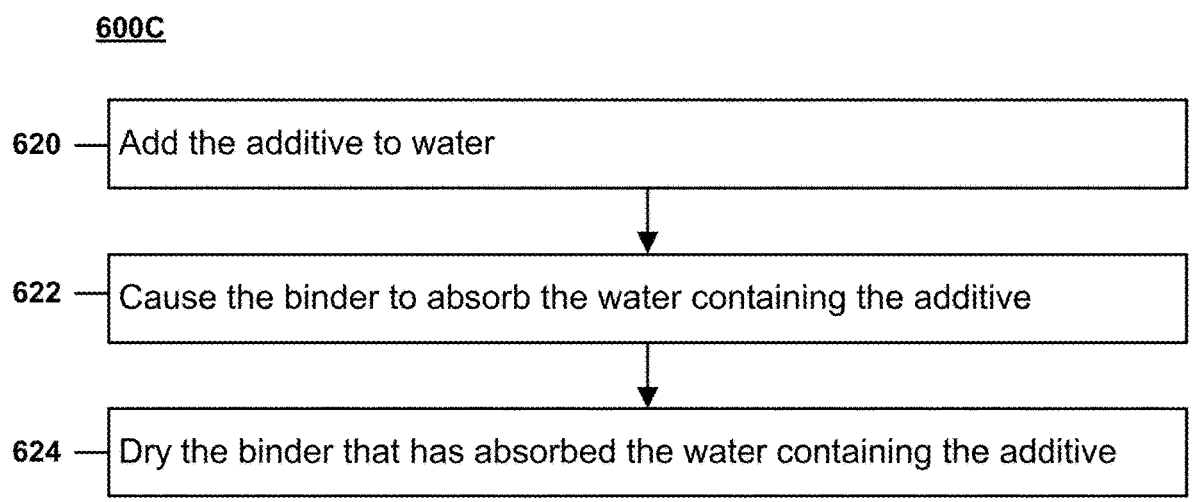

Method 600C will now be described with reference to FIG. 6C. Method 600C may be considered to comprise substeps of step 610 of method 600B (namely, binding the additive to the binder). In method 600C, at step 620, the additive is added to water. At step 622, the binder is caused to absorb the water containing the additive. At step 624, the binder that has absorbed the water containing the additive is dried. In this regard, the binder may be dried to such an extent as to have a moisture content not exceeding approximately 8 weight percent. Drying the binder (which serves as the environment of the plant source) to this extent may serve to prevent or delay germination of the plant source. Germination may be thus prevented or delayed until such time as the moisture content of the binder or the environment of the plant source is increased to approximately 16 weight percent, which increase may trigger germination of the plant source, as described above, e.g., with respect to step 606 of method 600A. As for step 624, not only may the binder be dried, but also the air or other contents of the container, or the environment in the vicinity of the container, may be dried.

Figure 6D:
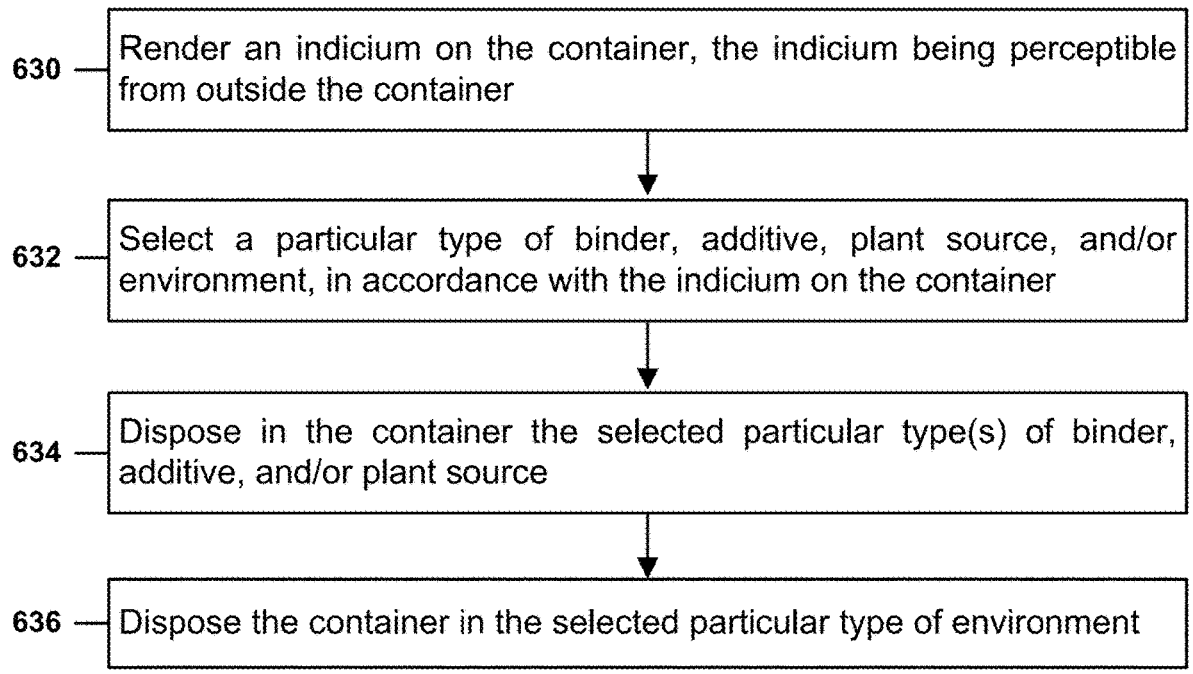

Method 600D will now be described with reference to FIG. 6D. In method 600D, at step 630, and indicium is rendered on the container. The indicium may be perceptible from outside the container. At step 632, a particular type of binder, additive, plant source, and/or (planting/growing) environment is selected. This selection may be made in accordance with the indicium on the container. At step 614, the selected particular type of binder, additive, and/or plant source is disposed in the container (this step is performed if a particular type of binder, additive, and/or plant source is selected in step 632). At step 616, the container is disposed in the selected particular type of environment (this step is performed if a particular type of environment is selected in step 632).

Many other methods have been fully described above in the description of agricultural systems according to the first set of further embodiments: e.g., methods involving applying coatings to various components of the system (e.g., of wax, or oil), adjusting pH, providing an RFID tag in or secured to the container, sterilizing the container, and sealing the container.

Another agricultural method that, according to some embodiments, may be combined with the above methods, includes a step of stratifying the plant source (e.g., seed). Stratification of the plant source may be performed prior to disposing the plant source in the container, or after the plant source is disposed in the container. By stratification is understood simulating natural conditions that a plant source generally must undergo in order to germinate; the plant source may be subjected to these conditions, e.g., prior to planting, in order to overcome dormancy or reduce the time to germination of a dormant seed. Stratification may involve adjusting the temperature and/or humidity. For example, stratification may involve subjecting the plant source to a period of cooling or freezing, to a period of heating, to one of these followed by the other, or to alternating periods of heating and cooling (or freezing). Such heating and cooling or freezing may be accomplished using a heater or refrigerator/freezer. Stratification may involve simulating, e.g., natural winter conditions. Different kinds of stratification may be suitable for different kinds (e.g., species, varieties) of plants. Stratification may be particularly useful in the case where the species or variety of plant is such that the seed (or other plant source) has a long dormancy period and/or the plant requires a long period of growth to be ready for harvesting. An example would be certain hardwood trees.

Another agricultural method that, according to some embodiments, may be combined with the above methods, includes a step of scarifying the plant source (e.g., seed). By scarification is understood altering the seed coat physically to make it permeable to water or gases, so as to hasten germination. Germination may be prevented or delayed due to the seed coat's imperviousness to water or gases. Scarification may be accomplished by various means, including mechanical means, e.g., breaking, scratching, filing, sanding, nicking with a knife, cracking gently; chemical means, e.g., applying an acid; and thermal stress, e.g., soaking in hot water.

Agricultural methods according to the second set of further embodiments will now be described. Terms used in the description of the agricultural methods according to the second set of further embodiments are to be understood in the same manner as those terms were used and defined in the above description of agricultural methods according to the first set of further embodiments, which description was provided with general reference to FIGS. 6A, 6B, 6C and 6D. An agricultural method according to the second set of further embodiments may comprise the following steps: providing a container containing pollen and a plant source; and disposing the container in an environment suitable for growth of the plant source. The providing step may comprise the following substeps: disposing the pollen in the container; and disposing the plant source in the container. The method may also include any of the following additional steps: applying an electric charge to the pollen; applying a coating to the pollen; disposing a preservative in the container; disposing a growing medium and/or a binder in the container; and disposing an additive in the container. In general, the many aspects and variations described above with respect to agricultural methods of the first set of further embodiments are applicable/adaptable to agricultural methods of the second set of further embodiments.

Figure 7:
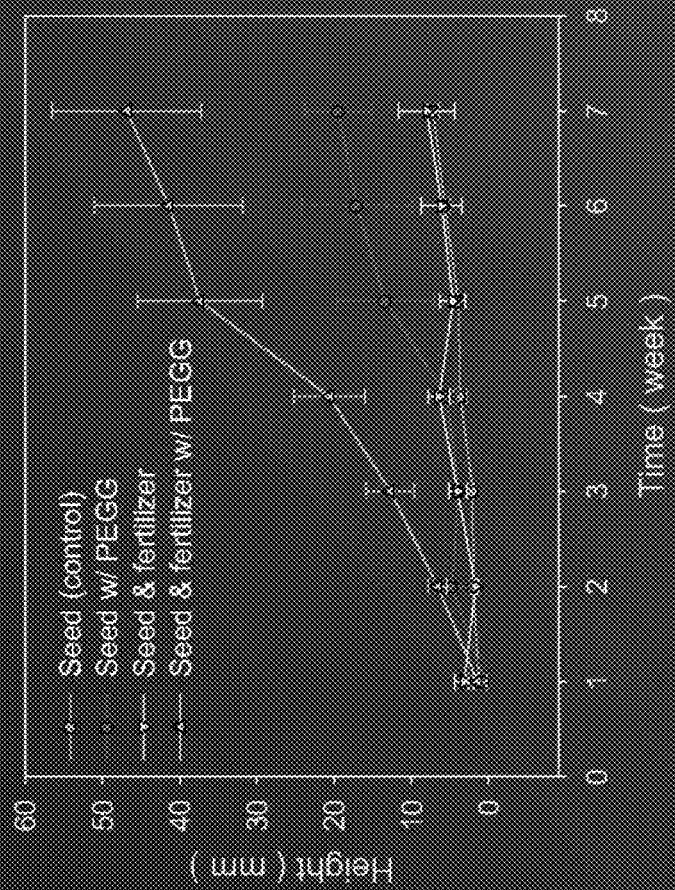
FIG. 7 is a graphical illustration comparing growing methods according to embodiments of the present disclosure with growing methods of the prior art, as to performance in respect of plant growth (height) over time.

Turning to FIG. 7, a description is now provided of data comprising results of experiments comparing agricultural systems and methods according to embodiments disclosed herein with growing methods of the prior art. Seeds of Juncus effuses, or common rush, were planted under four different growing regimes, and the results in terms of plant growth were compared. The four growing regimes are (as listed from top to bottom on the graph): (1) the seed was planted in soil, without fertilizer (a first control); (2) the seed was planted in a container containing a non-adherent growing medium, without fertilizer; (3) the seed was planted in soil, with fertilizer (a second control); and (4) the seed was planted in a container containing a non-adherent growing medium, with fertilizer. (The term "PEGG" used in FIG. 7 indicates that the seed or seed with fertilizer was contained in a container containing a non-adherent growing medium.)

The details of the experiment are as follows. Fifty cubic centimeters of 1:10 potting soil:sand mixture was placed in potting trays (60 wells per tray). The seeds or containers were placed on top of the soil mixture in each well. The temperature was controlled to be 82° F. in the daytime and 74° F. at night. The seeds/plants were watered twice a week for fifteen minutes each. Observations and measurements were made every week for seven weeks, starting a week after planting. Germination rate (percent of seeds that germinated), plant growth (plant height), and plant growth rate were measured. Plant height was measured from soil level to the uppermost set of leaves, using calipers.

FIG. 7 shows graphically the performance of the four growing regimes in respect of plant height over time. The performance of each of the four growing regimes is represented on the illustrated graph by a respective line defined by seven data points, one for each of the seven weeks. (On the graph, regime (1) is represented by a green line, regime (2) by a red line, regime (3) by a yellow line, and regime (4) by a blue line.) The data points defining the four lines (representing the four growing regimes) represent mean values, and the I-shaped bars about each data point represent the range of values for all of the seeds grown under the respective growing regimes. For example, at week 7, the mean plant height of the plants that grew from the seeds planted under regime (4) (seed in container with fertilizer) was about 45 mm, while the range of heights of those plants was from about 35 mm to about 57.5 mm. As seen in FIG. 7, the two regimes corresponding to methods and systems of embodiments of this disclosure (namely, regimes (4) and (2)) gave the best results, and the two prior art regimes (namely, regimes (1) and (3)) gave the worst results. Specifically, regime (4) performed the best, exhibiting a plant height that exceeded that of all the other regimes at every measurement (every week) beyond the first week. Regime (2) (seed in container without fertilizer) performed second best, exhibiting a plant height that exceeded that of prior art regimes (1) (seed in soil without fertilizer) and (3) (seed in soil with fertilizer) at four of the seven measurements (weeks), including the last three weeks. Thus, the two regimes corresponding to methods and systems of embodiments of this disclosure showed the greatest growth (final height, at week 7) and the fastest growth or highest growth rate (exhibiting greater heights at most or all of the weeks).

In the preceding discussion, reference may at times have been made to what are understood to be reasons underlying certain mechanisms, modes of operation or performance, improvements, advantages, etc. of embodiments disclosed herein. While statements of such reasons (whether or not explicitly referred to as "reasons") represent the inventor's beliefs based on his scientific understanding and experimentation, the inventor nonetheless does not wish to be bound by theory.

In light of the principles and exemplary embodiments described and illustrated herein, it will be recognized that the exemplary embodiments can be modified in arrangement and detail without departing from such principles. Also, the foregoing discussion has focused on particular embodiments, but other configurations are contemplated. In particular, even though expressions such as "in one embodiment," "in another embodiment," "in a version of the embodiment" or the like are used herein, these phrases are meant to generally reference the range of possibilities of embodiments, and are not intended to limit the disclosure to the particular embodiments and configurations described herein. As used herein, these terms may reference the same or different embodiments that are combinable into other embodiments.

Similarly, although exemplary processes have been described with regard to particular operations performed in a particular sequence, numerous modifications could be applied to those processes to derive numerous alternative embodiments of the present disclosure. For example, alternative embodiments may include processes that use fewer than all of the disclosed operations, processes that use additional operations, and processes in which the individual operations disclosed herein are combined, subdivided, rearranged, or otherwise altered.

In view of the wide variety of useful permutations that may be readily derived from the exemplary embodiments described herein, this detailed description is intended to be illustrative only, and should not be taken as limiting the scope of the disclosure. What is claimed as the disclosure, therefore, are all implementations that come within the scope of the following claims, and all equivalents to such implementations. In the claims, means-plus-function and step-plus-function clauses, if any, are intended to cover the structures or acts described herein as performing the recited function and not only structural equivalents, but also equivalent structures. Thus, while a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A system, comprising:
   a container, defining a boundary between an interior region, interior to the container, and an exterior of the container;
   a binder contained in the interior region of the container;
   one or more additives bound to the binder; and
   a plant seed contained in the interior region of the container;
   wherein the binder comprises one of:
   polyacrylamide;
   pulverized crystals of polyacrylamide;
   rice;
   ground rice;
   a hydrogel;
   a superabsorbent polymer;
   sodium bicarbonate;
   corn starch; or
   compost.
2. The system of claim 1, wherein the container is closed.
3. The system of claim 1, wherein the container is at least in part water permeable.
4. The system of claim 1, wherein the container is formed at least partly of a biodegradable material.
5. The system of claim 1, wherein the biodegradable material comprises a gelatin.
6. The system of claim 1, wherein the biodegradable material comprises a bone gelatin.
7. The system of claim 1, wherein the container comprises an indicium perceptible from the exterior.
8. The system of claim 1, wherein the container comprises an indicium perceptible from the exterior, and wherein the indicium corresponds to a particular type of one or more of the following: the binder, the one or more additives, the plant seed, an environment in which the container containing the binder, one or additives and plant seed is to be disposed.
9. The system of claim 1, wherein the container comprises two pieces.
10. The system of claim 1, wherein the container is approximately the size of a pharmaceutical capsule.
11. The system of claim 1, wherein the container is tamper-proof.
12. The system of claim 1, wherein the container is sterile prior to disposal therein of the binder, the one or more additives, and the plant seed.
13. The system of claim 1, further comprising a coating applied to the container.
14. The system of claim 1, further comprising a coating applied to the container, wherein the coating comprises an oil.
15. The system of claim 1, wherein the binder, the one or more additives, and the plant seed together do not occupy the entirety of the interior region.
16. The system of claim 1, wherein the binder, the one or more additives, and the plant seed together occupy the entirety of the interior region.
17. The system of claim 1, further comprising air contained in the interior region.
18. The system of claim 1, wherein the binder, the one or more additives, and the plant seed collectively have a mass of not more than approximately 735 mg.
19. The system of claim 1, wherein the binder has a moisture content of approximately 8 weight percent or less.
20. The system of claim 1, wherein the binder does not adhere to the plant seed.
21. The system of claim 1, wherein the binder does not completely surround the plant seed.
22. The system of claim 1, wherein the binder completely surrounds the plant seed.
23. The system of claim 1, wherein the binder comprises the polyacrylamide.
24. The system of claim 1, wherein the binder comprises the pulverized crystals of polyacrylamide.
25. The system of claim 1, wherein the binder comprises the rice.
26. The system of claim 1, wherein the binder comprises the ground rice.
27. The system of claim 1, wherein the binder comprises the hydrogel.
28. The system of claim 1, wherein the binder comprises the superabsorbent polymer.
29. The system of claim 1, wherein the binder comprises the sodium bicarbonate.
30. The system of claim 1, wherein the binder comprises the corn starch.
31. The system of claim 1, wherein the binder comprises the compost.
32. The system of claim 1, wherein wax is applied to the binder.
33. The system of claim 1, wherein the binder is operable to retain water and to limit release of the water.
34. The system of claim 1, wherein the binder is operable to retain water and to release the water at a variable rate depending on a moisture content of an environment of the binder.
35. The system of claim 1, wherein the binder is operable to retain water, and release of the water from the binder may be controlled by an operator.

36. The system of claim 1, wherein the binder is operable to retain the additive and to limit release of the additive.

37. The system of claim 1, wherein the binder is operable to retain the additive and to release the additive at a variable rate depending on a moisture content of an environment of the binder.

38. The system of claim 1, wherein the binder is operable to retain the additive, and release of the additive from the binder may be controlled by an operator.

39. The system of claim 1, wherein the binder is operable to time-release the additive.

40. The system of claim 1, further comprising a growing medium contained in the interior region.

41. The system of claim 1, further comprising a growing medium contained in the interior region, wherein the growing medium is organic.

42. The system of claim 1, further comprising a growing medium contained in the interior region, wherein the growing medium comprises soil.

43. The system of claim 1, wherein the additive comprises at least one of the following:
   an additive that promotes germination, growth or yield;
   an additive that promotes pest resistance; and
   an additive that promotes stress resistance.

44. The system of claim 1, wherein the additive comprises at least one of the following:
   a fertilizer, a pesticide, a hormone, a steroid, and a fungus capable of mycorrhizal association with a plant source or plant that is to grow from the plant seed.

45. The system of claim 1, wherein the additive comprises an antimicrobial agent.

46. The system of claim 1, wherein the additive comprises wax.

47. The system of claim 1, wherein the additive comprises beeswax.

48. The system of claim 1, wherein the additive comprises iron.

49. The system of claim 1, wherein the additive comprises iron and a material operable to render the binder more acidic.

50. The system of claim 1, wherein the additive comprises a material operable to adjust the pH of the binder.

51. The system of claim 1, wherein the additive comprises a preservative.

52. The system of claim 1, wherein the additive comprises a biodegradable material.

53. The system of claim 1, wherein the additive has been selected based on at least one of:
   the plant seed and an environment in which the container containing the binder, one or additives and plant seed is to be disposed.

54. The system of claim 1, wherein the additive is capable of being time-released.

55. The system of claim 1, wherein the additive is of a quantity so as to be exhausted by a time suitable for harvesting part or all of a plant that is to grow from the plant seed.

56. The system of claim 1, further comprising a coating applied to the additive.

57. The system of claim 1, further comprising a coating applied to the additive, wherein the coating comprises a wax.

58. The system of claim 1, wherein the one or more additives comprise a first additive comprising a fertilizer and a second additive comprising a fertilizer or a first additive comprising a pesticide and a second additive comprising a pesticide, and wherein the first additive is coated with a first amount of wax or with no wax and the second additive is coated with a second amount of wax, the second amount of wax exceeding the first amount of wax.

59. The system of claim 58, wherein the first and second additives are different kinds of fertilizer.

60. The system of claim 1, wherein the plant seed is a non-dormant seed.

61. The system of claim 1, wherein the plant seed is a dormant seed.

62. The system of claim 1, further comprising an RFID tag secured to, or disposed in, the container.

* * * * *